(12) United States Patent
Ajima et al.

(10) Patent No.: US 10,430,375 B2
(45) Date of Patent: Oct. 1, 2019

(54) PARALLEL COMPUTING SYSTEM AND COMMUNICATION CONTROL PROGRAM

(75) Inventors: Yuichiro Ajima, Kawasaki (JP); Toshiyuki Shimizu, Kawasaki (JP); Hiroaki Ishihata, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 885 days.

(21) Appl. No.: 12/872,338

(22) Filed: Aug. 31, 2010

(65) Prior Publication Data

US 2011/0213946 A1     Sep. 1, 2011

(30) Foreign Application Priority Data

Sep. 1, 2009   (JP) ................................. 2009-201560

(51) Int. Cl.
*G06F 15/80* (2006.01)
(52) U.S. Cl.
CPC .................................. *G06F 15/803* (2013.01)
(58) Field of Classification Search
None
See application file for complete search history.

(56) References Cited

U.S. PATENT DOCUMENTS

| | | | |
|---|---|---|---|
| 4,598,400 A | 7/1986 | Hillis | |
| 5,175,865 A | 12/1992 | Hillis | |
| 5,247,694 A | 9/1993 | Dahl | |
| 5,535,408 A | 7/1996 | Hillis | |
| 2006/0179270 A1 | 8/2006 | Archer et al. | |
| 2009/0292787 A1* | 11/2009 | Hosokawa | H04L 12/1886 709/206 |

FOREIGN PATENT DOCUMENTS

| | | |
|---|---|---|
| EP | 0206580 A2 | 12/1986 |
| EP | 0544532 A2 | 6/1993 |
| JP | 03-116357 A | 5/1991 |
| JP | 04-235654 A | 8/1992 |
| JP | 05-151181 A | 6/1993 |
| JP | 2004-536372 A | 12/2004 |
| JP | 2010-211553 A | 9/2010 |

(Continued)

OTHER PUBLICATIONS

Tseng et al. (Efficient Broadcasting in Wormhole-Routed Multicomputers: A Network-Partitioning Approach, Jan. 1999, pp. 44-61).*

(Continued)

*Primary Examiner* — George Giroux
(74) *Attorney, Agent, or Firm* — Fujitsu Patent Center

(57) ABSTRACT

A parallel computing system includes a plurality of processors multi-dimensionally commented by an interconnection network, wherein each of the processors in the parallel computing system determines, in dimensional order, communication channels to other processors in the interconnection network, each of the processors sets, as relative coordinates of destination processors with respect to the plurality of processors in data communications performed at a same timing, relative coordinates common to all of the processors, and each of the processors performs data communications with destination processors having the set relative coordinates.

14 Claims, 4 Drawing Sheets

(56) References Cited

FOREIGN PATENT DOCUMENTS

WO    WO 2002/069168 A1    9/2002

OTHER PUBLICATIONS

Suh et al. (Efficient All-to-All Personalized Exchange in Multidimensional Torus Networks, Aug. 1998, pp. 468-475).*

Yang et al. (Near-Optimal All-to-All Broadcast in Multidimensional All-Port Meshes and Tori, Feb. 2002, pp. 128-141).*

Adiga et al., "Blue Gene/L torus interconnection network", IBM Journal of Research and Development, vol. 49, No. 2/3, Mar./May 2005, pp. 265-276.

Almasi et al., "Optimization of MPI Collective Communication on BlueGene/L Systems," ICS '05: Proceedings of the 19th annual international conference on Supercomputing. New York, NY, USA: ACM, Jun. 20-22, 2005, pp. 253-262.

Bruck et al., "Efficient Algorithms for All-to-All Communications in Multiport Message-Passing Systems", IEEE Transactions on Parallel and Distributed Systems, vol. 8, No. 11, Nov. 11, 1997, pp. 1143-1156.

Scott, "Efficient All-to-All Communication Patterns in Hypercube and Mesh Topologies", IEEE, 6th Distributed Memory Computing Conference, 1991, pp. 398-403.

Hayashi et al., "Optimal All-to-All Communication Method in Torus Network", The 44$^{th}$ (First Half of Tear Heisei 4) Annual Conference of Information Processing Society of Japan, 1993, English-language Translation Provided, 6D-4, pp. 6-105-6-106.

Kumar et al., "Optimization of All-to-All Communication on the Blue Gene/L Supercomputer", 37th International Conference on Parallel Processing, IEEE, 2008, pp. 320-329.

Tipparaju et al., "Optimizing All-to-All Collective Communication by Exploiting Concurrency in Modern Networks", SC '05: Proceedings of the 2005 ACM/IEEE Conference on Supercomputing. Washington, DC, USA: IEEE Computer Society 2005, 9 pages.

Tseng et al., "All-to-All Personalized Communication in a Wormhole-Routed Torus", IEEE Transactions on Parallel and Distributed Systems, vol. 7, No. 5, May 5, 1996, pp. 498-505.

Japanese Office Action dated Oct. 15, 2013 for corresponding Japanese Application No. 2009-201560, with Partial English-language Translation.

Boku, Taisuke et al., "Performance Evaluation of Hyper Cross Bar Network" Technical Research Report for the Institute of Electronics, Information and Communication Engineers; Corporate Juridical Person The Institute of Electronics, Information and Communication Engineers, Nov. 16, 1993, vol. 93, No. 3230, (CPSY 93-35 to 44), pp. 41-48, with English-language Abstract & Pursuant to MPEP §609, in fulfillment of the requirement under 37 CFR §1.98(a)(3)(i) for a concise explanation of relevance regarding this cited reference, the Office's attention is directed to the Partial English-language translation of the official action mailed by the JPO as listed above in this section of form SB08.

Hillis, W. Daniel, "The Connection Machine: A Computer Architecture Based on Cellular Automata", Physica 10D, North Holland, Amsterdam, NL, vol. 10, No. 1-2, pp. 213-228, Jan. 1, 1984, XP024479362.

Extended European Search Report dated Feb. 15, 2011 for corresponding European Patent Application No. 10174920.8, 6 pages.

Tucker, Lewis W. et al.,"Architecture and Applications of the Connection Machine", Computer, IEEE Service Center, Los Alamitos, CA, US, vol. 21, No. 8, pp. 26-38, Aug. 1, 1988, XP000118166.

Hillis, W. Daniel et al.,"The CM-5 Connection Machine: A Scalable Supercomputer", Communications of the ACM, New York, US, vol. 36, No. 11, pp. 31-40, Nov. 1, 1993, XP000415037.

Leiserson, Charles et al.,"The Network Architecture of the Connection Machine CM-5", Journal of Parallel and Distributed Computing, Elsevier, Amsterdam, NL, vol. 33, No. 2, pp. 145-158, Mar. 15, 1996, XP004419204.

European Summons to attend oral proceedings pursuant to Rule 115(1) EPC dated Jun. 13, 2018 for corresponding European Patent Application No. 10174920.8, 8 pages. **Please note EP-0206580-A2 and EP-0544532-A2 cited herewith, were previously cited in and IDS filed on Feb. 8, 2016.

European Office Action dated Nov. 6, 2015 for corresponding European Patent Application No. 10174920.8, 5 pages. Please note EP-0206580-A2 cited herein, was previously cited in IDS filed on Feb. 8, 2016.*.

* cited by examiner

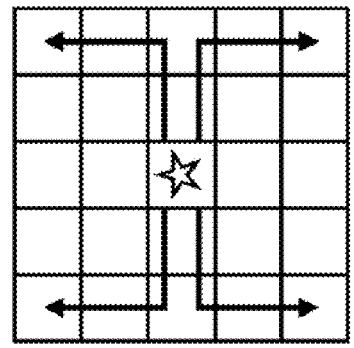
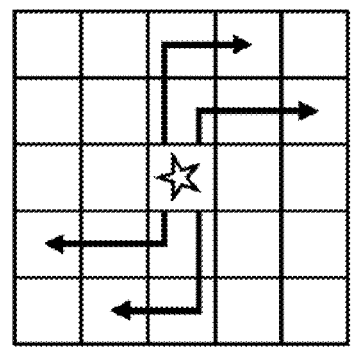
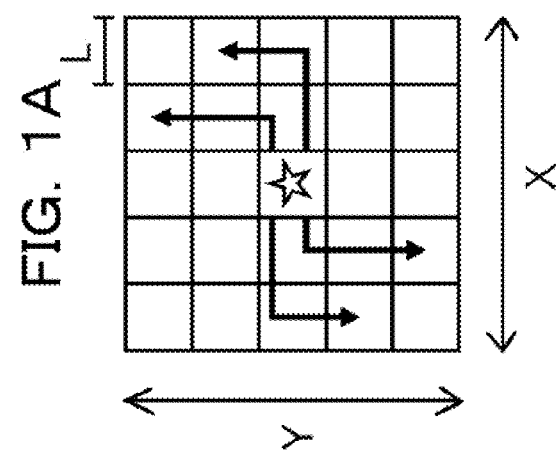

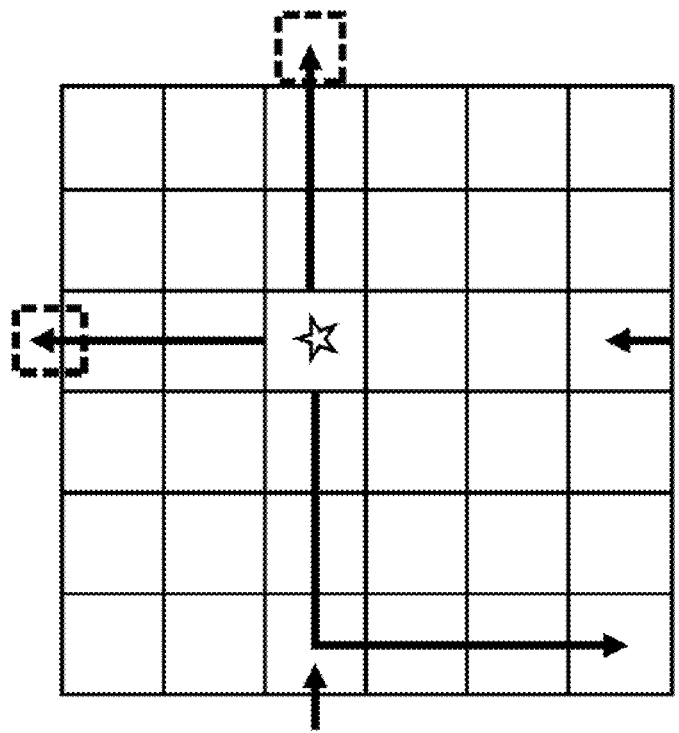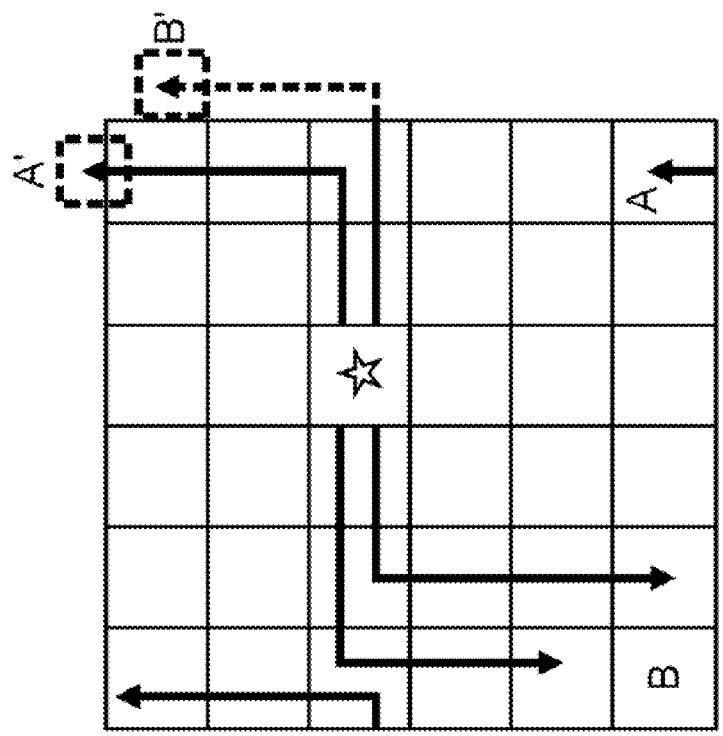

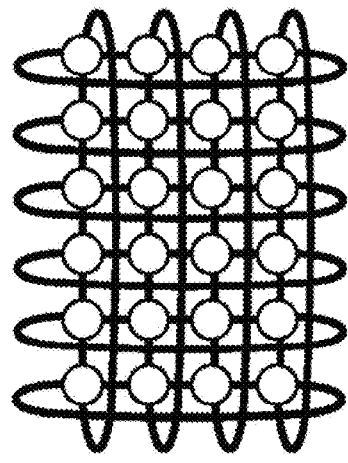
FIG. 3C
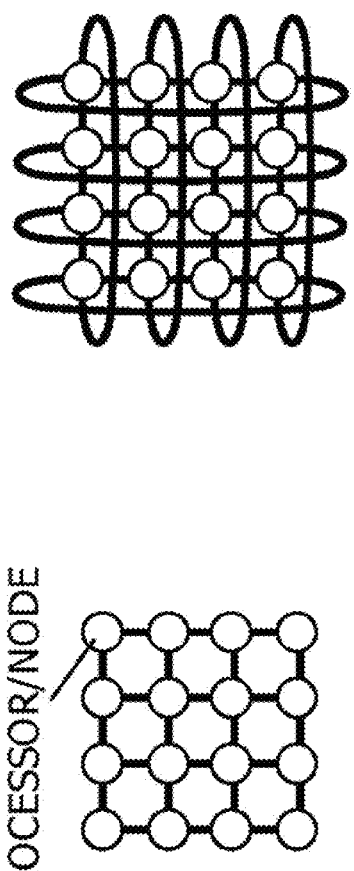
FIG. 3B
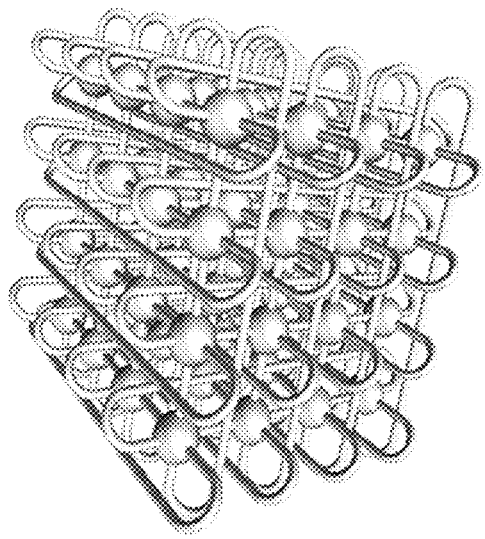
FIG. 3E
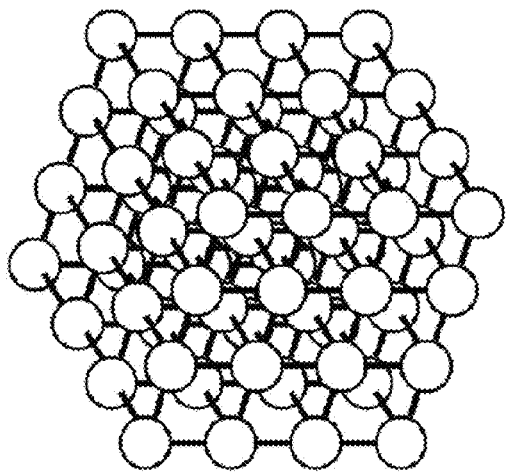
FIG. 3D
FIG. 3A
PROCESSOR/NODE

PARALLEL COMPUTING SYSTEM AND COMMUNICATION CONTROL PROGRAM

CROSS-REFERENCE TO RELATED APPLICATIONS

This application is based upon and claims the benefit of priority of prior Japanese Patent Application No. 2009-201560, filed on Sep. 1, 2009, the entire contents of which are incorporated herein by reference.

FIELD

Embodiments discussed herein relate to an all-to-all communication method performed in a parallel computer and the like.

BACKGROUND

In a distributed parallel computer, the inter-processor communication performance substantially affects the overall performance of an application. In a small bisection bandwidth network, such as a mesh and a torus, the overlapping of communication channels tends to occur, and thus the communication performance is deteriorated. Particularly in such a network, the development of a communication algorithm enabling the use of all bands is important.

"Mesh" refers to a system of network configuration for connecting processors of a parallel computer. According to the system, the processors are arranged at grid points of a multidimensional orthogonal grid, and adjacent ones of the processors are connected together in respective dimensions of multidimensional orthogonal coordinates.

"Torus" is another word referring to a system of network configuration of a parallel computer. According to the system, the processors are arranged at grid points of a multidimensional orthogonal grid, and adjacent ones of the processors are connected together in respective dimensions of multidimensional orthogonal coordinates. Further, the processors located at the ends in each of the dimensions are connected together, and thereby each of the dimensions has a circular coordinate system.

FIGS. 3A to 3E illustrate some examples of mesh and torus. FIGS. 3A to 3E illustrate states of connection between processors in various types of networks, wherein the processors are indicated by circles or spheres. FIG. 3A illustrates a two-dimensional 4×4 mesh, and FIG. 3B illustrates a two-dimensional 4×4 torus. Each of FIGS. 3A and 3B illustrates an example in which the lengths in the respective dimensions of the network are equal. Essentially, however, the lengths in the respective dimensions of the mesh or torus may be different. FIG. 3C illustrates an example of a two-dimensional 4×6 torus. Further, FIG. 3D illustrates an example of a three-dimensional 4×4×4 mesh, and FIG. 3E illustrates an example of a three-dimensional 4×4×4 torus.

"Bisection bandwidth" is an indicator indicating the bandwidth of a network, and refers to the sum of the bandwidths of all links present between two sections divided from a network so that each of the sections includes substantially the same number of processors, e.g., the bandwidths of data transfer channels connecting the processors. If there are a plurality of conceivable division patterns for dividing a network into two sections, a division pattern minimizing the bisection bandwidth is used.

All-to-all communication refers to communication in which each of all processors included in a distributed parallel computer takes a communication pattern of transferring mutually different messages to all of the other processors. All-to-all communication is frequently used in many applications, such as matrix transposition and fast Fourier transform.

Some all-to-all communication algorithms have been proposed so far which take the overlapping of communication channels in a network into account.

Non-Patent Document 1 proposes algorithms for hypercube and mesh topologies.

Non-Patent Documents 2 and 3 propose algorithms for n-dimensional torus topologies.

These algorithms achieve a theoretically minimum communication time. All of these algorithms assume "a method of phase division" in message communication. The algorithms divide inter-processor communication into a plurality of sets and sequentially carry out the sets of inter-processor communication, to thereby achieve all-to-all communication. Each processor repeats the transfer of messages and the suspension of the transfer as previously scheduled, to thereby increase the usage rate of all links of a network to 100%.

According to the method of phase division, however, all processors perform the transfer of messages and the suspension of the transfer in synchronization with one another. Further, all processors are synchronized at every start of each phase. Therefore, an issue arises when the method is used in an actual system. The method using phase division increases unnecessary overhead in all-to-all communication.

Non-Patent Document 5 uses, in BlueGene® (see Non-Patent Document 4), an algorithm combining the randomization of a communication address with the adaptive routing technique.

Non-Patent Document 6 discloses a technique using the static routing and the barrier synchronization in an asymmetric torus.

In some of parallel computers of recent years, one processor has a plurality of communication controllers. This type of hardware is capable of performing a plurality of message communications in parallel.

Non-Patent Documents 7 and 8 disclose methods of effectively using a plurality of communication controllers. Along with an increase in the degree of integration of LSI (Large-Scale Integration), it has become easier to mount a plurality of communication hardware modules on each processor. As a result, there has been an increasing desire for a method of effectively using a plurality of communication hardware modules with a specific communication pattern, such as all-to-all communication. Meanwhile, the methods of Non-Patent Documents 7 and 8 do not take the overlapping of communication channels into account, and thus deteriorate the communication performance of a parallel computer using a mesh or torus topology due to the overlapping of communication channels.

Related art includes the following:

Non-Patent Document 1: D. S. Scott, "Efficient all-to-all communication patterns in hypercube and mesh topologies," in 6th Distributed Memory Computing Conference, 1991, pp. 398-403;

Non-Patent Document 2: Takeshi Horie and Kenichi Hayashi, "Optimal All-to-All Communication Method in Torus Network," Transactions of Information Processing Society of Japan, vol. 34, no. 4, pp. 628-637, 1993;

Non-Patent Document 3: Y.-C. Tseng and S. K. S. Gupta, "All-to-all personalized communication in a wormhole-routed torus," IEEE Transactions on Parallel and Distributed Systems, vol. 7, no. 5, pp. 498-505, May 1996;

Non-Patent Document 4: N. R. Adiga, M. A. Blumrich, D. Chen, P. Coteus, A. Gara, M. E. Giampapa, P. Heidelberger, S. Singh, B. D. Steinmacher-Burow, T. Takken, M. Tsao, and P. Vranas, "Blue Gene/L torus interconnection network," IBM Journal of Research and Development, vol. 49, no. 2/3, pp. 265-276, 2005;

Non-Patent Document 5: G. Alamasi, P. Heidelberger, C. J. Archer, X. Martorell, C. C. Erway, J. E. Moreira, B. Steinmacher-Burow, and Y. Zheng, "Optimization of mpi collective communication on bluegene/l systems," in ICS '05: Proceedings of the 19th annual international conference on Supercomputing, New York, N.Y., USA: ACM, 2005, pp. 253-262;

Non-Patent Document 6: S. Kumar, Y. Sabharwal, R. Garg, and P. Heidelberger, "Optimization of All-to-All Communication on the Blue Gene/L Supercomputer," in 37th International Conference on Parallel Processing, September 2008, pp. 320-329;

Non-Patent Document 7: J. Bruck, C.-T. Ho, S. Kipnis, and D. Weathersby, "Efficient Algorithms for all-to-all communications in multi-port message-passing systems," in SPAR '94: Proceedings of the sixth annual ACM symposium on Parallel algorithms and architectures, New York, N.Y., USA: ACM, 1994, pp. 298-309; and Non-Patent Document 8: V. Tipparaju and J. Nieplocha, "Optimizing all-to-all collective communication by exploiting concurrency in modern networks," in SC '05: Proceedings of the 2005 ACM/IEEE conference on Supercomputing, Washington, D.C., USA: IEEE Computer Society, 2005, p. 46.

In optimal all-to-all communication for a torus network, the method of phase division has been employed. In the phase division, inter-processor communication is divided into a plurality of sets, and the sets of inter-processor communication are sequentially carried out to thereby achieve all-to-all communication. Communications in each phase are selected so that the overlapping of channels does not occur, and that all connections are used. According to this method, some processors perform communication and some processors do not perform communication in substantially the same communication phase. It is therefore necessary to achieve the communications of the respective processors by the co-operation of different control methods. As a result, there arises an issue of complicated control.

SUMMARY

An aspect of the present embodiments provide a parallel computing system, which multi-dimensionally connects a plurality of processors by using an interconnection network, determines, in dimensional order, communication channels from each of the processors in the parallel computing system to other processors in the interconnection network, sets, as the relative coordinates of destination processors with respect to each of the processors in data communications performed at substantially the same timing, relative coordinates common to all of the processors, and performs data communications with destination processors having the set relative coordinates.

According to a parallel computing system and program of an embodiment of the present invention, all-to-all communication using all links with substantially equal loads placed thereon is achieved in a parallel computing system using a two- or three-dimensional topology. According to the present embodiment, each of computing nodes performs substantially simultaneous inter-node communications with a plurality of destination nodes. In the parallel computing system and program of the present embodiment, substantially the same transmission control is performed on all of the nodes. It is therefore possible to reduce control overhead attributed to the dependencies among complicated inter-node controls. Further, according to the present embodiment, the respective processors determine the destination processors in accordance with the algorithms common thereto. Therefore, the implementation of the transmission control on the processors is performed.

Further, according to the parallel computing system and program of the present embodiments, it is possible to have substantially the same number of communications overlap in any of the communication channels, and to achieve desired all-to-all communication.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A to 1D illustrate a two-dimensional torus topology according to an embodiment, wherein each of the sides of the topology has a length corresponding to an odd number;

FIGS. 2A and 2B illustrate a two-dimensional torus topology according to an embodiment, wherein each of the sides of the topology has a length corresponding to an even number;

FIGS. 3A to 3E illustrate examples of network configuration; and

DESCRIPTION OF EMBODIMENTS

Figure 4:
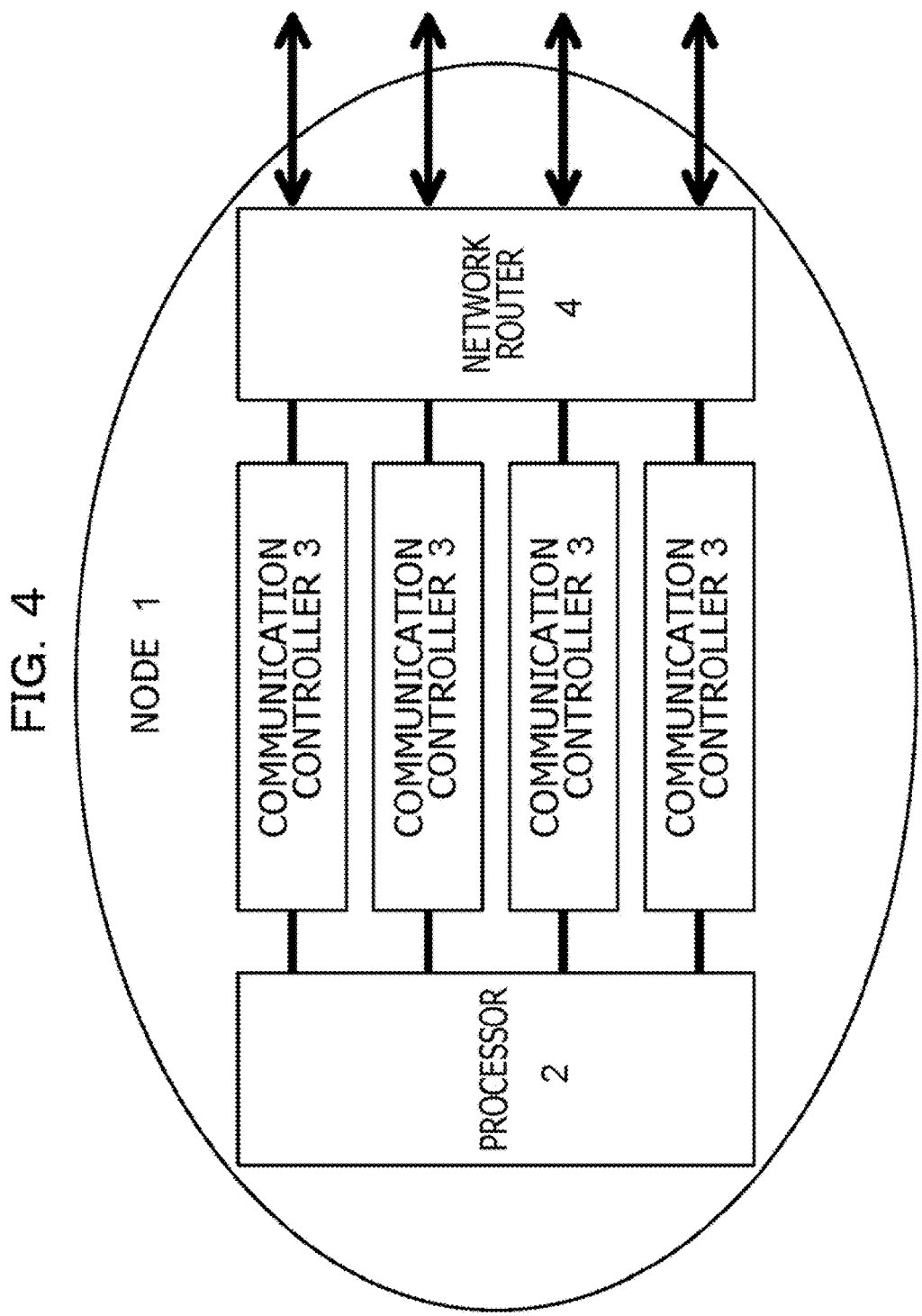
FIG. 4 illustrates a configuration of a node according to an embodiment.

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present.

Embodiments of the present invention will be described below.

First Embodiment

A parallel computing system according to an embodiment of the present invention connects a plurality of processors by using an interconnection network. In the present embodiment, the interconnection network is a two-dimensional torus, and the communication channels of the interconnection network are determined in dimensional order. Further, the length in a first dimension and the length in a second dimension of the interconnection network are equal to each other. See FIG. 1 for an example of the parallel computing system according to the embodiment. Each grid in FIG. 1 denotes a processor.

Each of the processors included in the parallel computing system of the present embodiment is capable of substantially simultaneously transmitting data to a maximum of four processors. Further, in the substantially simultaneous data transmission from each source processor to the respective destination processors, the relative coordinates of the destination processors with respect to the source processor are set to be common to all of the processors included in the parallel computing system.

In the present embodiment, the length in the first dimension and the length in the second dimension of the interconnection network are represented as L. Herein, the length "L" indicates the number of links in the direction of each dimension, and does not necessarily refer to the physical length. This definition similarly applies to the other embodiments.

Further, in the relative coordinates of the n-th destination processor with respect to a source processor, the relative coordinate value in the first dimension is represented as $X_n$, and the relative coordinate value in the second dimension is represented as $Y_n$. In the present embodiment, an arbitrary source processor in the parallel computing system substantially simultaneously transmits data to destination processors by using all links of the two-dimensional torus interconnection network with substantially equal loads placed on the links.

In the parallel computing system according to the present embodiment, each of the processors performs the following operations.

The relative coordinates of the first destination processor with respect to an arbitrary source processor are now represented as "$X_1$, $Y_1$." "X" denotes coordinate in X axis, and "Y" denotes coordinate in Y axis which is perpendicular to X axis. According to a first relative coordinate value determination algorithm, each of the processors determines the relative coordinate values of the relative coordinates "$X_1$, $Y_1$" as follows:

1) Set the absolute value of $X_1$ and the absolute value of $Y_1$ to be different from each other; and 2) Set $X_1$ to zero and set the absolute value of $Y_1$ to be different from half the L value, or set $Y_1$ to zero and set the absolute value of $X_1$ to be different from half the L value.

In this case, the relative coordinate values of the relative coordinates indicating three other destination processors are determined as follows.

1) In relative coordinates "$X_2$, $Y_2$," set $X_2$ to the sign-inverted value of $X_1$, and set $Y_2$ to the sign-inverted value of $Y_1$.

2) In relative coordinates "$X_3$, $Y_3$," set $X_3$ to $Y_1$, and set $Y_3$ to $X_1$.

3) In relative coordinates "$X_4$, $Y_4$," set $X_4$ to the sign-inverted value of $Y_1$, and set $Y_4$ to the sign-inverted value of $X_1$.

Each of the processors in the parallel computing system substantially simultaneously transmits data to four destination processors located at the respective positions of the above-determined relative coordinates "$X_1$, $Y_1$," "$X_2$, $Y_2$," "$X_3$, $Y_3$," and "$X_4$, $Y_4$." In this process, all of the processors in the parallel computing system perform, at substantially the same timing, substantially simultaneous data transmission to four destination processors indicated by substantially the same relative coordinates. Therefore, the present embodiment is capable of transmitting data by using all links of the two-dimensional torus interconnection network with substantially equal loads placed on the links.

Further, according to a second relative coordinate value determination algorithm, each of the processors sets the relative coordinate values of relative coordinates "$X_1$, $Y_1$" of a destination processor as follows:

1) Set the absolute value of $X_1$ to be equal to the absolute value of $Y_1$; and 2) Set the absolute value of $X_1$ and the absolute value of $Y_1$ to be different from half the L value.

In this case, each of the processors determines the relative coordinate values of the relative coordinates indicating three other destination processors as follows.

1) In relative coordinates "$X_2$, $Y_2$," set $X_2$ to the sign-inverted value of $X_1$, and set $Y_2$ to the sign-inverted value of $Y_1$.

2) In relative coordinates "$X_3$, $Y_3$," set $X_3$ to $Y_1$, and set $Y_3$ to $X_1$.

3) In relative coordinates "$X_4$, $Y_4$," set $X_4$ to the sign-inverted value of $Y_1$, and set $Y_4$ to the sign-inverted value of $X_1$.

Each of all processors in the parallel computing system substantially simultaneously transmits data to four destination processors located at the respective positions of the above-determined relative coordinates "$X_1$, $Y_1$," "$X_2$, $Y_2$," "$X_3$, $Y_3$," and "$X_4$, $Y_4$."

Meanwhile, according to a third relative coordinate value determination algorithm, each of the processors sets the relative coordinate values of relative coordinates "$X_1$, $Y_1$" of a destination processor as follows:

1) Set the absolute value of $X_1$ to be equal to the absolute value of $Y_1$; and 2) Set the absolute value of $X_1$ and the absolute value of $Y_1$ to half the L value.

In this case, each of the processors determines the relative coordinate values of the relative coordinates of two other destination processors as follows.

1) In relative coordinates "$X_2$, $Y_2$," set $X_2$ to the sign-inverted value of $X_1$, and set $Y_2$ to zero.

2) In relative coordinates "$X_3$, $Y_3$," set $X_3$ to zero, and set $Y_3$ to the sign-inverted value of $Y_1$.

Each of the processors in the parallel computing system substantially simultaneously transmits data to three destination processors located at the respective positions of the above-determined relative coordinates "$X_1$, $Y_1$," "$X_2$, $Y_2$," and "$X_3$, $Y_3$" by using all links of the two-dimensional torus interconnection network with substantially equal loads placed on the links.

In the present embodiment, the above-described three types of relative coordinate value determination algorithms are combined as specified to determine the destination processors to which data should be substantially simultaneously transmitted.

Herein, if the L value is an odd number, the number of the processors included in the parallel computing system is also an odd number. With respect to an arbitrary source processor, therefore, the number of the destination processors to be subjected to all-to-all communication is an even number. In this case, each of the processors performs substantially simultaneous transmission to four destination processors by performing the substantially simultaneous transmission the $(L-1)^2/4$ times with the absolute value of $X_1$ and the absolute value of $Y_1$ set to be different from each other and performing the substantially simultaneous transmission the $(L-1)/2$ times with the absolute value of $X_1$ and the absolute value of $Y_1$ set to be equal to each other, while changing the relative coordinate values for each of the substantially simultaneous transmissions and determining the relative coordinate values of the destination processors so that data is not transmitted to the same processor more than once.

Meanwhile, if the L value is an even number, the number of the processors included in the parallel computing system is an even number. With respect to an arbitrary source processor, therefore, the number of the destination processors to be subjected to all-to-all communication is an odd number. In this case, therefore, each of the processors performs substantially simultaneous transmission to four destination processors the $(L-1)^2/4$ times with the absolute value of X1 and the absolute value of Y1 set to be different from each other, performs substantially simultaneous transmission to four destination processors the $(L/2-1)$ times with the absolute value of X1 and the absolute value of Y1 set to be equal to each other, and performs one substantially simultaneous transmission to three destination processors with the absolute value of X1 and the absolute value of Y1 set to be equal to each other and set to half the L value, while changing the relative coordinate values for each of the simultaneous transmissions and determining the relative coordinate values of the destination processors so that the overlapping of destination processors does not occur.

According to the above-described operations, if the transfer distances of data substantially simultaneously transmitted from each of the processors are added up for each of the dimensions and directions, the sum of the transfer distances from each of the processors is equal among all dimensions and directions. Further, all of the processors perform data transfer to the same relative coordinates. It is therefore possible to achieve all-to-all communication in the parallel computing system with equal loads placed on the links. If the L value is an even number, however, the parallel computing system may arbitrarily determine the transfer direction for each data transfer in a dimension in which the absolute value of the corresponding relative coordinate is half the L value.

In the parallel computing system of the present embodiment, each of the processors performs substantially simultaneous transmission to a plurality of destination processors a plurality of times. Herein, simultaneous transmission performed by all of the processors in a similar manner is a condition for equalizing the loads on the links. In some cases, however, the processors have different processing times due to disturbance factors. As a result, asymmetry may occur in which, during a substantially simultaneous communication by a processor, another processor starts the next simultaneous communication.

If all of the processors in the parallel computing system are synchronized between a substantially simultaneous transmission and the next transmission communication, the occurrence of asymmetry due to disturbance factors is inhibited. It is therefore possible that all of the processors perform substantially simultaneous transmission in the same phase at substantially the same time. This feature similarly applies to the other embodiments described later. The synchronization of the processors is performed with the use of a synchronization mechanism by hardware, which is generally provided in a parallel computing system. Even if a parallel computing system does not include a synchronization mechanism, as in the case of a PC (Personal Computer) cluster or the like, the parallel computing system may use a synchronization library usually provided by software.

The processing of determining the relative coordinate values of the destination processors may be performed by each of the processors every time the data transmission processing is performed. Further, the relative coordinate values of the destination processors previously determined by an arbitrary algorithm may be set in a table or the like of each of the processors, and the relative coordinate values set in the table or the like may be read by each of the processors every time the data transmission processing is performed.

Second Embodiment

A parallel computing system according to a second embodiment of the present invention connects a plurality of processors by using an interconnection network. In the present embodiment, the interconnection network is a two-dimensional torus, and the communication channels of the interconnection network are determined in dimensional order. Further, the length in a first dimension and the length in a second dimension of the interconnection network are different from each other.

Each of the processors in the parallel computing system according to the second embodiment is capable of substantially simultaneously transmitting data to a maximum of four processors. The relative coordinates used when data is substantially simultaneously transmitted from each of the processors to a plurality of destination processors are common to all of the processors included in the parallel computing system.

In the second embodiment, the maximum value of the length in the first dimension and the length in the second dimension of the interconnection network is represented as L. Further, in the relative coordinates of the n-th destination processor with respect to a source processor, the relative coordinate value in the first dimension is represented as Xn, and the relative coordinate value in the second dimension is represented as Yn. If any of the length in the first dimension and the length in the second dimension is less than the L value, however, a transmittable range corresponding to the length in the dimension is preset, and the transmission operation is not performed to relative coordinates exceeding the transmittable range.

In the present embodiment, each of the processors in the parallel computing system substantially simultaneously transmits data to destination processors having the relative coordinates determined as follows, by using the respective links of the two-dimensional torus interconnection network with a load of a specified value or less placed on each of the links.

According to a first relative coordinate value determination algorithm, each of the processors first determines the relative coordinate values of relative coordinates "X1, Y1" of a destination processor as follows:

1) Set the absolute value of X1 to be different from the absolute value of Y1; and 2) Set X1 to zero and set the absolute value of Y1 to be different from half the L value, or set Y1 to zero and set the absolute value of X1 to be different from half the L value.

In this case, each of the processors determines the relative coordinate values of the relative coordinates of three other destination processors as follows.

1) In relative coordinates "X2, Y2," set X2 to the sign-inverted value of X1, and set Y2 to the sign-inverted value of Y1.

2) In relative coordinates "X3, Y3," set X3 to Y1, and set Y3 to X1.

3) In relative coordinates "X4, Y4," set X4 to the sign-inverted value of Y1, and set Y4 to the sign-inverted value of X1.

Each of the processors in the parallel computing system substantially simultaneously transmits data to four destination processors located at the respective positions of the above-determined relative coordinates "X1, Y1," "X2, Y2," "X3, Y3," and "X4, Y4" by using all links of the two-dimensional torus interconnection network with substantially equal loads placed on the links.

Further, according to a second relative coordinate value determination algorithm, each of the processors sets the relative coordinate values of relative coordinates "X1, Y1" of a destination processor as follows:

1) Set the absolute value of X1 to be equal to the absolute value of Y1; and

2) Set the absolute value of X1 and the absolute value of Y1 to be different from half the L value.

In this case, each of the processors determines the relative coordinate values of the relative coordinates of three other destination processors as follows.

1) In relative coordinates "X2, Y2," set X2 to the sign-inverted value of X1, and set Y2 to the sign-inverted value of Y1.

2) In relative coordinates "X3, Y3," set X3 to Y1, and set Y3 to X1.

3) In relative coordinates "X4, Y4," set X4 to the sign-inverted value of Y1, and set Y4 to the sign-inverted value of X1.

Each of the processors in the parallel computing system substantially simultaneously transmits data to four destination processors located at the above-determined relative coordinates "X1, Y1," "X2, Y2," "X3, Y3," and "X4, Y4" by using the respective links of the two-dimensional torus interconnection network with a load of a specified value or less placed on each of the links.

Further, according to a third relative coordinate value determination algorithm, each of the processors sets the relative coordinate values of relative coordinates "X1, Y1" of a destination processor as follows:

1) Set the absolute value of X1 to be equal to the absolute value of Y1; and

2) Set the absolute value of X1 and the absolute value of Y1 to half the L value.

In this case, each of the processors determines the relative coordinate values of the relative coordinates of two other destination processors as follows.

1) In relative coordinates "X2, Y2," set X2 to the sign-inverted value of X1, and set Y2 to zero.

2) In relative coordinates "X3, Y3," set X3 to zero, and set Y3 to the sign-inverted value of Y1.

Each of the processors in the parallel computing system substantially simultaneously transmits data to three destination processors located at the above-determined relative coordinates "X1, Y1," "X2, Y2," and "X3, Y3" by using the respective links of the two-dimensional torus interconnection network with a load of a specified value or less placed on each of the links.

If the L value is an odd number, each of the processors performs substantially simultaneous transmission to four destination processors by performing the substantially simultaneous transmission the $(L-1)^2/4$ times with the absolute value of X1 and the absolute value of Y1 set to be different from each other and performing the substantially simultaneous transmission the $(L-1)/2$ times with the absolute value of X1 and the absolute value of Y1 set to be equal to each other, while changing the relative coordinate values of the destination processors in each of the simultaneous transmissions so that the overlapping of destination processors does not occur.

Meanwhile, if the L value is an even number, each of the processors performs substantially simultaneous transmission to four destination processors the $(L-1)^2/4$ times with the absolute value of X1 and the absolute value of Y1 set to be different from each other, performs substantially simultaneous transmission to four destination processors the $(L/2-1)$ times with the absolute value of X1 and the absolute value of Y1 set to be equal to each other, and performs one substantially simultaneous transmission to three destination processors with the absolute value of X1 and the absolute value of Y1 set to be equal to each other and set to half the L value so that the overlapping of destination processors does not occur.

Third Embodiment

In a third embodiment of the present invention, a parallel computing system connects a plurality of processors by using an interconnection network. The interconnection network is a two-dimensional mesh, and the communication channels of the interconnection network are determined in dimensional order. Further, each of the processors in the parallel computing system substantially simultaneously transmits data to a maximum of four processors. Herein, the relative coordinates of a plurality of destination processors with respect to an arbitrary processor are common to all of the processors included in the parallel computing system.

In the present embodiment, the maximum value of the length in a first dimension and the length in a second dimension of the interconnection network is represented as L. Further, in the relative coordinates of the n-th destination processor with respect to a source processor, the relative coordinate value in the first dimension is represented as Xn, and the relative coordinate value in the second dimension is represented as Yn. If the relative coordinates of a destination processor with respect to an arbitrary processor are located outside the interconnection network, however, the transmission from the processor to the destination processor is not performed.

Herein, each of the processors determines the relative coordinate values of relative coordinates "X1, Y1" of a destination processor as follows:

1) Set the absolute value of X1 to be different from the absolute value of Y1; and 2) Set X1 to zero and set the absolute value of Y1 to be different from half the L value, or set Y1 to zero and set the absolute value of X1 to be different from half the L value.

In this case, the relative coordinate values of the relative coordinates of three other destination processors are determined as follows.

1) In relative coordinates "X2, Y2," set X2 to the sign-inverted value of X1, and set Y2 to the sign-inverted value of Y1.

2) In relative coordinates "X3, Y3," set X3 to Y1, and set Y3 to X1.

3) In relative coordinates "X4, Y4," set X4 to the sign-inverted value of Y1, and set Y4 to the sign-inverted value of X1.

Each of the processors in the parallel computing system substantially simultaneously transmits data to four destination processors located at the respective positions of the above-determined relative coordinates "X1, Y1," "X2, Y2," "X3, Y3," and "X4, Y4" by using the respective links of the two-dimensional mesh interconnection network with a load of a specified value or less placed on each of the links.

Then, each of the processors determines the relative coordinate values of relative coordinates "X1, Y1" of a destination processor as follows:

1) Set the absolute value of X1 to be equal to the absolute value of Y1; and

2) Set the absolute value of X1 and the absolute value of Y1 to be different from half the L value.

In this case, each of the processors determines the relative coordinate values of three other destination processors as follows.

1) In relative coordinates "X2, Y2," set X2 to the sign-inverted value of X1, and set Y2 to the sign-inverted value of Y1.

2) In relative coordinates "X3, Y3," set X3 to Y1, and set Y3 to X1.

3) In relative coordinates "X4, Y4," set X4 to the sign-inverted value of Y1, and set Y4 to the sign-inverted value of X1.

Each of all processors in the parallel computing system substantially simultaneously transmits data to four destination processors located at the respective positions of the above-determined relative coordinates "X1, Y1," "X2, Y2," "X3, Y3," and "X4, Y4" by using the respective links of the two-dimensional mesh interconnection network with a load of a specified value or less placed on each of the links.

Further, each of the processors determines the relative coordinate values of relative coordinates "X1, Y1" of a destination processor as follows:

1) Set the absolute value of X1 to be equal to the absolute value of Y1; and

2) Set the absolute value of X1 and the absolute value of Y1 to half the L value.

In this case, each of the processors determines the relative coordinate values of other destination processors as follows.

1) In relative coordinates "X2, Y2," set X2 to the sign-inverted value of X1, and set Y2 to zero.

2) In relative coordinates "X3, Y3," set X3 to zero, and set Y3 to the sign-inverted value of Y1.

Each of all processors in the parallel computing system substantially simultaneously transmits data to three destination processors located at the above-determined relative coordinates "X1, Y1," "X2, Y2," and "X3, Y3" by using the respective links of the two-dimensional mesh interconnection network with a load of a specified value or less placed on each of the links.

Herein, if the L value is an odd number, an arbitrary processor performs substantially simultaneous transmission to four destination processors by performing the substantially simultaneous transmission the $(L-1)^2/4$ times with the absolute value of X1 and the absolute value of Y1 in the relative coordinates of the destination processor set to be different from each other and performing the simultaneous transmission the $(L-1)/2$ times with the absolute value of X1 and the absolute value of Y1 set to be equal to each other so that the overlapping of destination processors does not occur.

Meanwhile, if the L value is an even number, an arbitrary processor performs substantially simultaneous transmission to four destination processors the $(L-1)^2/4$ times with the absolute value of X1 and the absolute value of Y1 set to be different from each other, performs substantially simultaneous transmission to four destination processors the $(L/2-1)$ times with the absolute value of X1 and the absolute value of Y1 set to be equal to each other, and performs one substantially simultaneous transmission to three destination processors so that the overlapping of destination processors does not occur.

Fourth Embodiment

In a parallel computing system according to a fourth embodiment of the present invention, the interconnection network is a three-dimensional torus, and the communication channels of the interconnection network are determined in dimensional order. Further, the length in a first dimension, the length in a second dimension, and the length in a third dimension of the interconnection network are substantially equal to one another.

Each of the processors in the parallel computing system of the present embodiment substantially simultaneously transmits data to a maximum of six processors. Further, the relative coordinates of a plurality of destination processors with respect to an arbitrary processor are common to all of the processors included in the parallel computing system. In the present embodiment, an arbitrary source processor in the parallel computing system simultaneously transmits data to the destination processors in accordance with the following procedure by using all links of the three-dimensional torus interconnection network with substantially equal loads placed on the links.

Herein, each of the length in the first dimension, the length in the second dimension, and the length in the third dimension of the interconnection network is represented as L. Further, in the relative coordinates of the n-th destination processor with respect to a source processor, the relative coordinate value in the first dimension is represented as Xn, the relative coordinate value in the second dimension is represented as Yn, and the relative coordinate value in the third dimension is represented as Zn.

Herein, a case is assumed in which each of the processors sets the relative coordinate values of relative coordinates "X1, Y1, Z1" of an arbitrary destination processor in the following procedure. In this case, at least one of the absolute value of X1, the absolute value of Y1, and the absolute value of Z1 is different from the other absolute values, and the relative coordinates correspond to one of the following conditions:

1) Set X1 to zero, and set one of the absolute value of Y1 and the absolute value of Z1 to be different from half the L value;

2) Set Y1 to zero, and set one of the absolute value of X1 and the absolute value of Z1 to be different from half the L value;

3) Set Z1 to zero, and set one of the absolute value of X1 and the absolute value of Y1 to be different from half the L value;

4) Set X1 and Y1 to zero, and set the absolute value of Z1 to be different from half the L value;

5) Set X1 and Z1 to zero, and set the absolute value of Y1 to be different from half the L value; or 6) Set Y1 and Z1 to zero, and set the absolute value of X1 to be different from half the L value.

In this case, each of the processors determines the relative coordinates of five other destination processors as follows.

1) In relative coordinates "X2, Y2, Z2," set X2 to the sign-inverted value of X1, set Y2 to the sign-inverted value of Y1, and set Z2 to the sign-inverted value of Z1.

2) In relative coordinates "X3, Y3, Z3," set X3 to Z1, set Y3 to X1, and set Z3 to Y1.

3) In relative coordinates "X4, Y4, Z4," set X4 to the sign-inverted value of Z1, set Y4 to the sign-inverted value of X1, and set Z4 to the sign-inverted value of Y1.

4) In relative coordinates "X5, Y5, Z5," set X5 to Y1, set Y5 to Z1, and set Z5 to X1.

5) In relative coordinates "X6, Y6, Z6," set X6 to the sign-inverted value of Y1, set Y6 to the sign-inverted value of Z1, and set Z6 to the sign-inverted value of X1.

Each of all processors in the parallel computing system substantially simultaneously transmits data to six destination processors located at the respective positions of the above-determined relative coordinates "X1, Y1, Z1," "X2, Y2, Z2," "X3, Y3, Z3," "X4, Y4, Z4," "X5, Y5, Z5," and "X6, Y6, Z6" by using all links of the three-dimensional torus interconnection network with substantially equal loads placed on the links.

Further, all of the processors perform, at substantially the same timing, simultaneous data transmission to destination processors having the same relative coordinate values.

Further, each of the processors determines the relative coordinate values of relative coordinates "X1, Y1, Z1" of a destination processor as follows:

1) Set the absolute value of X1, the absolute value of Y1, and the absolute value of Z1 to be equal to one another; and 2) Set the absolute value of X1, the absolute value of Y1, and the absolute value of Z1 to be different from half the L value.

In this case, each of the processors determines the relative coordinates of three other destination processors as follows.

1) In relative coordinates "X2, Y2, Z2," set X2 to the sign-inverted value of X1, set Y2 to the sign-inverted value of Y1, and set Z2 to the sign-inverted value of Z1.

2) In relative coordinates "X3, Y3, Z3," set X3 to X1, set Y3 to Y1, and set Z3 to the sign-inverted value of Z1.

3) In relative coordinates "X4, Y4, Z4," set X4 to the sign-inverted value of X1, set Y4 to the sign-inverted value of Y1, and set Z4 to Z1.

Each of all processors in the parallel computing system substantially simultaneously transmits data to four destination processors located at the above-determined relative coordinates "X1, Y1, Z1," "X2, Y2, Z2," "X3, Y3, Z3," and "X4, Y4, Z4" by using all links of the three-dimensional torus interconnection network with substantially equal loads placed on the links.

Further, each of the processors determines the relative coordinate values of relative coordinates "X1, Y1, Z1" of a destination processor as follows:

1) Set the absolute value of X1, the absolute value of Y1, and the absolute value of Z1 to be equal to one another; and 2) Set the absolute value of X1, the absolute value of Y1, and the absolute value of Z1 to half the L value.

In this case, each of the processors determines the relative coordinates of six other destination processors as follows.

1) In relative coordinates "X2, Y2, Z2," set X2 to the sign-inverted value of X1, and set Y2 and Z2 to zero.

2) In relative coordinates "X3, Y3, Z3," set X3 to zero, set Y3 to the sign-inverted value of Y1, and set Z3 to the sign-inverted value of Z1.

3) In relative coordinates "X4, Y4, Z4," set X4 and Z4 to zero, and set Y4 to Y1.

4) In relative coordinates "X5, Y5, Z5," set X5 to X1, set Y5 to zero, and set Z5 to Z1.

5) In relative coordinates "X6, Y6, Z6," set X6 and Y6 to zero, and set Z6 to the sign-inverted value of Z1.

6) In relative coordinates "X7, Y7, Z7," set X7 to the sign-inverted value of X1, set Y7 to the sign-inverted value of Y1, and set Z7 to zero.

Each of all processors in the parallel computing system performs, as the first simultaneous transmission, substantially simultaneous data transmission to the first destination processor corresponding to the relative coordinates "X1, Y1, Z1," the second destination processor corresponding to the relative coordinates "X2, Y2, Z2," and the third destination processor corresponding to the relative coordinates "X3, Y3, Z3" by using all links of the three-dimensional torus interconnection network with substantially equal loads placed on the links. Then, each of the source processors performs, as the second simultaneous transmission, substantially simultaneous data transmission to the fourth destination processor corresponding to the relative coordinates "X4, Y4, Z4," the fifth destination processor corresponding to the relative coordinates "X5, Y5, Z5," the sixth destination processor corresponding to the relative coordinates "X6, Y6, Z6," and the seventh destination processor corresponding to the relative coordinates "X7, Y7, Z7" by using all links of the three-dimensional torus interconnection network with substantially equal loads placed on the links. That is, in the present example, the data transmission to seven destination processors in total is performed in two sessions.

The parallel computing system according to the present embodiment determines the relative coordinates of the destination processors by combining, as required, the above-described three types of relative coordinate value determination algorithms, and performs the substantially simultaneous data transmission to the destination processors.

Herein, if the L value is an odd number, an arbitrary processor performs substantially simultaneous transmission to six destination processors the $(L^3-4L+3)/4$ times, and performs substantially simultaneous transmission to four destination processors the L−1 times such that the overlapping of destination processors does not occur.

Meanwhile, if the L value is an even number, an arbitrary processor performs simultaneous transmission to six destination processors the $(L^3-4L+1)/4$ times, performs substantially simultaneous transmission to four destination processors the L−2 times, and performs substantially simultaneous transmission to seven destination processors with one substantially simultaneous transmission to three destination processors and one substantially simultaneous transmission to four destination processors so that the overlapping of destination processors does not occur.

Fifth Embodiment

A parallel computing system according to a fifth embodiment of the present invention connects a plurality of processors by using an in interconnection network. The interconnection network according to the fifth embodiment is a three-dimensional torus, and the communication channels of the interconnection network are determined in dimensional order. Further, at least one of the length in a first dimension, the length in a second dimension, and the length in a third dimension of the interconnection network is different from the lengths in the other dimensions. Further, each of all processors in the parallel computing system substantially simultaneously transmits data to a maximum of six processors. The relative coordinates of a plurality of destination processors used when data is substantially simultaneously transmitted from an arbitrary processor to the destination processors are common to all of the processors included in the parallel computing system.

Herein, the maximum value of the length in the first dimension, the length in the second dimension, and the length in the third dimension of the interconnection network is represented as L. Further, in the relative coordinates of the n-th destination processor with respect to a source processor, the relative coordinate value in the first dimension is represented as $X_n$, the relative coordinate value in the second dimension is represented as $Y_n$, and the relative coordinate value in the third dimension is represented as $Z_n$. If any of the length in the first dimension, the length in the second dimension, and the length in the third dimension is less than the L value, however, a transmittable range corresponding to the length in the dimension is preset, and the transmission processing is not performed to a processor located at relative coordinates exceeding the transmittable range.

Herein, each of the processors determines the relative coordinate values of relative coordinates "X1, Y1, Z1" of a destination processor as follows.

Herein, if at least one of the absolute value of X1, the absolute value of Y1, and the absolute value of Z1 is different from the other absolute values, 1) Set X1 to zero, and set one of the absolute value of Y1 and the absolute value of Z1 to be different from half the L value, 2) Set Y1 to zero, and set one of the absolute value of X1 and the absolute value of Z1 to be different from half the L value, 3) Set Z1 to zero, and set one of the absolute value of X1 and the absolute value of Y1 to be different from half the L value, 4) Set X1 and Y1 to zero, and set the absolute value of Z1 to be different from half the L value, 5) Set X1 and Z1 to zero, and set the absolute value of Y1 to be different from half the L value, or 6) Set Y1 and Z1 to zero, and set the absolute value of X1 to be different from half the L value.

In this case, each of the processors determines the relative coordinates of five other destination processors as follows.

1) In relative coordinates "X2, Y2, Z2," set X2 to the sign-inverted value of X1, set Y2 to the sign-inverted value of Y1, and set Z2 to the sign-inverted value of Z1.

2) In relative coordinates "X3, Y3, Z3," set X3 to Z1, set Y3 to X1, and set Z3 to Y1.

3) In relative coordinates "X4, Y4, Z4," set X4 to the sign-inverted value of Z1, set Y4 to the sign-inverted value of X1, and set Z4 to the sign-inverted value of Y1.

4) In relative coordinates "X5, Y5, Z5," set X5 to Y1, set Y5 to Z1, and set Z5 to X1.

5) In relative coordinates "X6, Y6, Z6," set X6 to the sign-inverted value of Y1, set Y6 to the sign-inverted value of Z1, and set Z6 to the sign-inverted value of X1

Each of all processors in the parallel computing system substantially simultaneously transmits data to six destination processors located at the above-determined relative coordinates "X1, Y1, Z1" to "X6, Y6, Z6" by using the respective links of the three-dimensional torus interconnection network with a load of a specified value or less placed on each of the links.

Further, it is now assumed that each of the processors determines the relative coordinate values of relative coordinates "X1, Y1, Z1" of a destination processor as follows:

1) Set the absolute value of X1, the absolute value of Y1, and the absolute value of Z1 to be equal to one another; and 2) Set the absolute value of X1, the absolute value of Y1, and the absolute value of Z1 to be different from half the L value.

In this case, each of the processors determines the relative coordinates of three other destination processors as follows.

1) In relative coordinates "X2, Y2, Z2," set X2 to the sign-inverted value of X1, set Y2 to the sign-inverted value of Y1, and set Z2 to the sign-inverted value of Z1.

2) In relative coordinates "X3, Y3, Z3," set X3 to X1, set Y3 to Y1, and set Z3 to the sign-inverted value of Z1.

3) In relative coordinates "X4, Y4, Z4," set X4 to the sign-inverted value of X1, set Y4 to the sign-inverted value of Y1, and set Z4 to Z1.

Each of all processors in the parallel computing system substantially simultaneously transmits data to four destination processors located at the above-determined relative coordinates "X1, Y1, Z1" to "X4, Y4, Z4" by using the respective links of the three-dimensional torus interconnection network with a load of a specified value or less placed on each of the links.

Meanwhile, each of the processors determines the relative coordinate values of relative coordinates "X1, Y1, Z1" of a destination processor as follows:

1) Set the absolute value of X1, the absolute value of Y1, and the absolute value of Z1 to be equal to one another; and 2) Set the absolute value of X1, the absolute value of Y1, and the absolute value of Z1 to half the L value.

In this case, each of the processors determines the relative coordinates of six other destination processors as follows.

1) In relative coordinates "X2, Y2, Z2," set X2 to the sign-inverted value of X1, and set Y2 and Z2 to zero.

2) In relative coordinates "X3, Y3, Z3," set X3 to zero, set Y3 to the sign-inverted value of Y1, and set Z3 to the sign-inverted value of Z1.

3) In relative coordinates "X4, Y4, Z4," set X4 and Z4 to zero, and set Y4 to Y1.

4) In relative coordinates "X5, Y5, Z5," set X5 to X1, set Y5 to zero, and set Z5 to Z1.

5) In relative coordinates "X6, Y6, Z6," set X6 and Y6 to zero, and set Z6 to the sign-inverted value of Z1.

6) In relative coordinates "X7, Y7, Z7," set X7 to the sign-inverted value of X1, set Y7 to the sign-inverted value of Y1, and set Z7 to zero.

Each of all processors in the parallel computing system performs, as the first simultaneous transmission, substantially simultaneous data transmission to the first destination processor corresponding to the relative coordinates "X1, Y1, Z1," the second destination processor corresponding to the relative coordinates "X2, Y2, Z2," and the third destination processor corresponding to the relative coordinates "X3, Y3, Z3" by using all links of the three-dimensional torus interconnection network with substantially equal loads placed on the links. Then, each of the source processors performs, as the second simultaneous transmission, substantially simultaneous data transmission to the fourth destination processor corresponding to the relative coordinates "X4, Y4, Z4," the fifth destination processor corresponding to the relative coordinates "X5, Y5, Z5," the sixth destination processor corresponding to the relative coordinates "X6, Y6, Z6," and the seventh destination processor corresponding to the relative coordinates "X7, Y7, Z7" by using the respective links of the three-dimensional torus interconnection network with a load of a specified value or less placed on each of the links.

The parallel computing system according to the present embodiment determines the relative coordinates of the destination processors by combining, as required, the above-described three types of relative coordinate value determination algorithms, and performs the substantially simultaneous data transmission to the destination processors.

Herein, if the L value is an odd number, each of the processors performs substantially simultaneous transmission to six destination processors the $(L^3-4L+3)/4$ times, and performs substantially simultaneous transmission to four destination processors the L−1 times so that the overlapping of destination processors does not occur.

Further, if the L value is an even number, each of the processors performs substantially simultaneous transmission to six destination processors the $(L^3-4L+1)/4$ times, performs substantially simultaneous transmission to four destination processors the L−2 times, and performs substantially simultaneous transmission to seven destination processors with one substantially simultaneous transmission to three destination processors and one substantially simultaneous transmission to four destination processors so that the overlapping of destination processors does not occur.

Sixth Embodiment

A parallel computing system according to a sixth embodiment of the present invention connects a plurality of processors by using an interconnection network. The interconnection network is a three-dimensional mesh, and the communication channels of the interconnection network are determined in dimensional order. Further, each of all processors in the parallel computing system substantially simultaneously transmits data to a maximum of six processors. The relative coordinates of a plurality of destination processors with respect to each of the processors are common to all of the processors included in the parallel computing system.

Herein, the maximum value of the length in a first dimension, the length in a second dimension, and the length in a third dimension of the interconnection network is represented as L. Further, in the relative coordinates of the n-th destination processor with respect to a source processor, the relative coordinate value in the first dimension is represented as Xn, the relative coordinate value in the second dimension is represented as Yn, and the relative coordinate value in the third dimension is represented as Zn. If a destination processor is located outside the interconnection network, however, the transmission to the destination processor is not performed.

Each of the processors determines the relative coordinate values of relative coordinates "X1, Y1, Z1" of a destination processor as follows.

In this case, each of the processors determines the relative coordinate values so that at least one of the absolute value of X1, the absolute value of Y1, and the absolute value of Z1 is different from the other absolute values, and that the relative coordinate values correspond to one of the following conditions:

1) Set X1 to zero, and set one of the absolute value of Y1 and the absolute value of Z1 to be different from half the L value;

2) Set Y1 to zero, and set one of the absolute value of X1 and the absolute value of Z1 to be different from half the L value;

3) Set Z1 to zero, and set one of the absolute value of X1 and the absolute value of Y1 to be different from half the L value;

4) Set X1 and Y1 to zero, and set the absolute value of Z1 to be different from half the L value;

5) Set X1 and Z1 to zero, and set the absolute value of Y1 to be different from half the L value; or 6) Set Y1 and Z1 to zero, and set the absolute value of X1 to be different from half the L value.

In this case, each of the processors determines the relative coordinates of five other destination processors as follows.

1) In relative coordinates "X2, Y2, Z2," set X2 to the sign-inverted value of X1, set Y2 to the sign-inverted value of Y1, and set Z2 to the sign-inverted value of Z1.

2) In relative coordinates "X3, Y3, Z3," set X3 to Z1, set Y3 to X1, and set Z3 to Y1.

3) In relative coordinates "X4, Y4, Z4," set X4 to the sign-inverted value of Z1, set Y4 to the sign-inverted value of X1, and set Z4 to the sign-inverted value of Y1.

4) In relative coordinates "X5, Y5, Z5," set X5 to Y1, set Y5 to Z1, and set Z5 to X1.

5) In relative coordinates "X6, Y6, Z6," set X6 to the sign-inverted value of Y1, set Y6 to the sign-inverted value of Z1, and set Z6 to the sign-inverted value of X1.

Each of all processors in the parallel computing system substantially simultaneously transmits data to six destination processors located at the above-determined relative coordinates "X1, Y1, Z1" to "X6, Y6, Z6" by using the respective links of the three-dimensional mesh interconnection network with a load of a specified value or less placed on each of the links.

Further, each of the processors determines the relative coordinate values of relative coordinates "X1, Y1, Z1" of a destination processor as follows:

1) Set the absolute value of X1, the absolute value of Y1, and the absolute value of Z1 to be equal to one another; and 2) Set the absolute value of X1, the absolute value of Y1, and the absolute value of Z1 to be different from half the L value.

In this case, each of the processors determines the relative coordinates of three other destination processors as follows.

1) In relative coordinates "X2, Y2, Z2," set X2 to the sign-inverted value of X1, set Y2 to the sign-inverted value of Y1, and set Z2 to the sign-inverted value of Z1.

2) In relative coordinates "X3, Y3, Z3," set X3 to X1, set Y3 to Y1, and set Z3 to the sign-inverted value of Z1.

3) In relative coordinates "X4, Y4, Z4," set X4 to the sign-inverted value of X1, set Y4 to the sign-inverted value of Y1, and set Z4 to Z1.

Each of all processors in the parallel computing system substantially simultaneously transmits data to four destination processors located at the above-determined relative coordinates "X1, Y1, Z1" to "X4, Y4, Z4" by using the respective links of the three-dimensional mesh interconnection network with a load of a specified value or less placed on each of the links.

Further, it is now assumed that each of the processors determines the relative coordinate values of relative coordinates "X1, Y1, Z1" of a destination processor as follows:

1) Set the absolute value of X1, the absolute value of Y1, and the absolute value of Z1 to be equal to one another; and 2) Set the absolute value of X1, the absolute value of Y1, and the absolute value of Z1 to half the L value.

In this case, each of the processors determines the relative coordinate values of six other destination processors as follows.

1) In relative coordinates "X2, Y2, Z2," set X2 to the sign-inverted value of X1, and set Y2 and Z2 to zero.

2) In relative coordinates "X3, Y3, Z3," set X3 to zero, set Y3 to the sign-inverted value of Y1, and set Z3 to the sign-inverted value of Z1.

3) In relative coordinates "X4, Y4, Z4," set X4 and Z4 to zero, and set Y4 to Y1.

4) In relative coordinates "X5, Y5, Z5," set X5 to X1, set Y5 to zero, and set Z5 to Z1.

5) In relative coordinates "X6, Y6, Z6," set X6 and Y6 to zero, and set Z6 to the sign-inverted value of Z1.

6) In relative coordinates "X7, Y7, Z7," set X7 to the sign-inverted value of X1, set Y7 to the sign-inverted value of Y1, and set Z7 to zero.

Each of all processors in the parallel computing system performs, as the first simultaneous transmission, substantially simultaneous data transmission to the first destination processor corresponding to the relative coordinates "X1, Y1, Z1," the second destination processor corresponding to the relative coordinates "X2, Y2, Z2," and the third destination processor corresponding to the relative coordinates "X3, Y3, Z3" by using all links of the three-dimensional mesh interconnection network with substantially equal loads placed on the links. Then, each of the source processors performs, as the second simultaneous transmission, substantially simultaneous data transmission to the fourth destination processor corresponding to the relative coordinates "X4, Y4, Z4," the fifth destination processor corresponding to the relative coordinates "X5, Y5, Z5," the sixth destination processor corresponding to the relative coordinates "X6, Y6, Z6," and the seventh destination processor corresponding to the relative coordinates "X7, Y7, Z7" by using the respective links of the three-dimensional mesh interconnection network with a load of a specified value or less placed on each of the links.

Herein, if the L value is an odd number, each of the processors performs substantially simultaneous transmission to six destination processors the $(L^3-4L+3)/4$ times, and performs substantially simultaneous transmission to four destination processors the L−1 times so that the overlapping of destination processors does not occur.

Meanwhile, if the L value is an even number, each of the processors performs substantially simultaneous transmission to six destination processors the $(L^3-4L+1)/4$ times, performs substantially simultaneous transmission to four destination processors the L−2 times, and performs substantially simultaneous transmission to seven destination processors with one substantially simultaneous transmission to three destination processors and one substantially simultaneous transmission to four destination processors so that the overlapping of destination processors does not occur.

In the above-described example of three-dimensional torus interconnection network, all of the processors in the parallel computing system are synchronized between a substantially simultaneous transmission and the next substantially simultaneous transmission. Accordingly, even if asymmetry occurs in the loads on the links of the three-dimensional torus interconnection network, all of the processors perform substantially the same simultaneous transmission at substantially the same time.

In the all-to-all communication method according to the embodiments described above, each of the processors transmits and receives a plurality of messages in parallel in accordance with a plurality of communication controllers provided in the corresponding node. In this process, the processors serving as communication destinations are arranged in order. Thereby, the relative coordinates of the destination processors with respect to each of nodes are set to be the same among all of the nodes, and the number of inter-processor communications routed through all links between network routers of the system is equalized among the links.

Seventh Embodiment

In a parallel computing system using a two-dimensional torus which connects nodes 1 each configured to include a processor 2, four communication controllers 3, and a network router 4, as illustrated in FIG. 4, the number of inter-processor communications routed through the respective links is equalized among the links in accordance with the following algorithms.

FIGS. 1A to 1D are diagrams illustrating an example of a two-dimensional torus topology. The two-dimensional torus topology illustrated in FIGS. 1A to 1D has two sides having the same length corresponding to an odd number.

In the two-dimensional torus topology of FIGS. 1A to 1D, the length of each of the sides is represented as 2n+1, wherein "n" represents a natural number. Further, the star illustrated in FIGS. 1A to 1D indicates a source processor.

In the two-dimensional torus topology according to the present embodiment, for all values of natural numbers i and j represented as $0<j<i\le n$, each of all processors first performs substantially simultaneous communication with four processors respectively located at relative coordinates (i, j), (−i, −j), (j, i), and (−j, −i) with respect to the processor (FIG. 1A).

Then, each of the processors performs substantially simultaneous communication with four processors respectively located at relative coordinates (i, −j), (−i, j), (−j, i), and (j, −i) with respect to the processor (FIG. 1B).

Further, for all values of a natural number i represented as $0<i\le n$, each of the processors performs substantially simultaneous communication with four processors respectively located at relative coordinates (i, 0), (−i, 0), (0, i), and (0, −i) with respect to the processor (FIG. 1C).

Then, each of the processors performs substantially simultaneous communication with four processors respectively located at relative coordinates (i, i), (−i, −i), (−i, i), and (i, −i) with respect to the processor (FIG. 1D).

Eighth Embodiment

FIGS. 2A and 2B illustrate a two-dimensional torus topology which has two sides having the same length corresponding to an even number. Also in FIGS. 2A and 2B, the star indicates a source processor.

In the example of FIGS. 2A and 2B, the length of each of the sides is represented as 2n+2. In a similar manner as in the example of two-dimensional torus topology illustrated in FIGS. 1A to 1D, in which the topology has two sides having the same length corresponding to an odd number, an arbitrary processor communicates with a processor having a value of at least −n and at most n as the relative coordinate thereof on each of the coordinate axes with respect to the arbitrary processor. Then, in accordance with the following combinations, the arbitrary processor communicates with the remaining processors having a value of −n−1 or n+1 as the relative coordinate thereof on at least one of the coordinate axes with respect to the arbitrary processor.

For all values of a natural number i represented as $0<i\le n$, each of all processors first performs substantially simultaneous communication with four processors respectively located at relative coordinates (n+1, i), (−n−1, −i), (i, n+1), and (−i, −n−1) with respect to the processor (FIG. 2A).

Then, each of all processors performs substantially simultaneous communication with three processors respectively located at relative coordinates (n+1, 0), (0, n+1), and (−n−1, −n−1) with respect to the processor (FIG. 2B).

Ninth Embodiment

In a parallel computing system using a three-dimensional torus, in which each of the processors has six communication controllers, the number of inter-processor communications routed through all links is equalized among the links in accordance with the following algorithms.

The following description will be made of an example of a three-dimensional torus topology which has three sides having the same length corresponding to an odd number. Herein, the length of each of the sides is represented as 2n+1. For all values of natural numbers i, j, and k represented as $0<k<j<i\le n$, each of the processors first performs simultaneous communication with six processors in accordance with the following combinations of relative coordinates. Here, "i", "J" and "k" denotes coordinate values of X axis, Y axis and Z axis of a three-dimensional torus topology. In the following, six sets of relative coordinates form one group. This feature similarly applies to the subsequent examples.

1) (i, j, k), (−i, −j, −k), (k, i, j), (−k, −i, −j), (j, k, i), (−j, −k, −i)

2) (i, j, −k), (−i, −j, k), (−k, i, j), (k, −i, −j), (j, −k, i), (−j, k, −i)

3) (i, −j, k), (−i, j, −k), (k, i, −j), (−k, −i, j), (−j, k, i), (j, −k, −i)

4) (i, −j, −k), (−i, j, k), (−k, i, −j), (k, −i, j), (−j, −k, i), (j, k, −i)

5) (i, k, j), (−i, −k, −j), (j, i, k), (−j, −i, −k), (k, j, i), (−k, −j, −i)

6) (i, k, −j), (−i, −k, j), (−j, i, k), (j, −i, −k), (k, −j, i), (−k, j, −i)

7) (i, −k, j), (−i, k, −j), (j, i, −k), (−j, −i, k), (−k, j, i), (k, −j, −i) 8) (i, −k, −j), (−i, k, j), (−j, i, −k), (j, −i, k), (−k, −j, i), (k, j, −i)

Then, for all values of natural numbers i and j represented as 0<j≤i≤n, each of the processors performs substantially simultaneous communication with six processors corresponding to the following combinations of relative coordinates with respect to the processor. Also in the following example, six sets of relative coordinates form one group.

1) (i, i, j), (−i, −i, −j), (j, i, i), (−j, −i, −i), (i, j, i), (−i, −j, −i)

2) (i, i, −j), (−i, −i, j), (−j, i, i), (j, −i, −i), (i, −j, i), (−i, j, −i)

3) (i, −i, j), (−i, i, −j), (j, i, −i), (−j, −i, i), (−i, j, i), (i, −j, −i)

4) (i, −i, −j), (−i, i, j), (−j, i, −i), (j, −i, i), (−i, −j, i), (i, j, −i)

5) (j, j, i), (−j, −j, −i), (i, j, j), (−i, −j, −j), (j, i, j), (−j, −i, −j)

6) (j, j, −i), (−j, −j, i), (−i, j, j), (i, −j, −j), (j, −i, j), (−j, i, −j)

7) (j, −j, i), (−j, j, −i), (i, j, −j), (−i, −j, j), (−j, i, j), (j, −i, −j)

8) (j, −j, −i), (−j, j, i), (−i, j, −j), (i, −j, j), (−j, −i, j), (j, i, −j)

9) (0, i, j), (0, −i, −j), (j, 0, i), (−j, 0, −i), (i, j, 0), (−i, −j, 0)

10) (0, i, −j), (0, −i, j), (−j, 0, i), (j, 0, −i), (i, −j, 0), (−i, j, 0)

11) (0, j, i), (0, −j, −i), (i, 0, j), (−i, 0, −j), (j, i, 0), (−j, −i, 0)

12) (0, j, −i), (0, −j, i), (−i, 0, j), (i, 0, −j), (j, −i, 0), (−j, i, 0)

Further, for all values of a natural number i represented as 0<i≤n, each of the processors performs substantially simultaneous communication with a plurality of processors corresponding to the following combinations of relative coordinates with respect to the processor.

1) (0, i, i), (0, −i, −i), (i, 0, i), (−i, 0, −i), (i, i, 0), (−i, −i, 0)

2) (i, 0, 0), (−i, 0, 0), (0, 0, i), (0, 0, −i), (0, i, 0), (0, −i, 0)

3) (i, i, i), (−i, −i, −i), (i, i, −i), (−i, −i, i)

4) (i, −i, i), (−i, i, −i), (i, −i, −i), (−i, i, i)

Tenth Embodiment

Description will be made of a three-dimensional torus topology which has three sides having the same length corresponding to an even number. In the present example, the length of each of the sides is represented as 2n+2. In a similar manner as in the example of three-dimensional torus topology, in which the topology has three sides having the same length corresponding to an odd number, an arbitrary processor communicates with a processor having a value of at least −n and at most n as each of the relative coordinates thereof on the respective coordinate axes (x-axis, y-axis, and z-axis) with respect to the arbitrary processor. Then, in accordance with the following combinations, the arbitrary processor communicates with, among the remaining processors, the processors having a value of −n−1 or n+1 as the relative coordinate thereof on at least one of the three coordinate axes.

Subsequently, for all values of natural numbers i and j represented as 0<j≤i≤n, each of the processors performs substantially simultaneous communication with six processors corresponding to the following combinations of relative coordinates with respect to the processor.

1) (n+1, i, j), (−n−1, −i, −j), (j, n+1, i), (−j, −n−1, −i), (i, j, n+1), (−j, −j, −n−1)

2) (n+1, i, −j), (−n−1, −i, j), (−j, n+1, i), (j, −n−1, −i), (i, −j, n+1), (−i, j, −n−1)

3) (n+1, j, i), (−n−1, −j, −i), (i, n+1, j), (−i, −n−1, −j), (j, i, n+1), (−j, −i, −n−1)

4) (n+1, −j, i), (−n−1, j, −i), (i, n+1, −j), (−i, −n−1, j), (−j, i, n+1), (j, −i, −n−1)

Further, for all values of a natural number i represented as 0<i≤n, each of the processors performs substantially simultaneous communication with six processors corresponding to the following combinations of relative coordinates with respect to the processor.

1) (n+1, i, i), (−n−1, −i, −i), (i, n+1, i), (−i, −n−1, −i), (i, i, n+1), (−i, −i, −n−1)

2) (n+1, i, −i), (−n−1, −i, i), (−i, n+1, i), (i, −n−1, −i), (i, −i, n+1), (−i, i, −n−1)

3) (n+1, i, 0), (−n−1, −i, 0), (0, n+1, i), (0, −n−1, −i), (i, 0, n+1), (−i, 0, −n−1)

4) (n+1, 0, i), (−n−1, 0, −i), (i, n+1, 0), (−i, −n−1, 0), (0, i, n+1), (0, −i, −n−1)

5) (i, n+1, n+1), (−i, −n−1, −n−1), (n+1, i, n+1), (−n−1, −i, −n−1), (n+1, n+1, i), (−n−1, −n−1, −i)

Finally, each of the processors performs substantially simultaneous communication with a plurality of processors corresponding to the following combinations of relative coordinates with respect to the processor.

1) (n+1, n+1, 0), (0, 0, n+1), (−n−1, 0, −n−1), (0, −n−1, 0)

2) (0, n+1, n+1), (n+1, 0, 0), (−n−1, −n−1, −n−1)

In the above-described embodiments, the processing in which each of the processors determines the destination processors is performed as a program recorded in a recording medium is executed by each of the processors. The recording medium for recording the program may include a storage device, e.g., as a magnetic disk device included in a node provided with the processor. Further, the program may be stored in a portable recording medium, e.g., an optical disk and a magnetic disk, read from the portable recording medium with the use of a storage medium reading device provided to the node or the like, and executed by the processor. Various types of semiconductor recording devices may be used as the recording medium for recording the program.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to What it claimed is:

1. A parallel computing system comprising:
a plurality of processors multi-dimensionally coupled via an interconnection network having torus or mesh topology, each of the plurality of processors in the parallel computing system being configured to:
determine, in dimensional order, communication channels to other processors in the interconnection network,
be provided with a relative coordinate system whose origin is set as the each processor, the relative coordinate system being common to all of the plurality of processors,
perform a simultaneous data-transmission including:
determining a distinct set of plural destination relative coordinates whose values are symmetric about the origin of the relative coordinate system provided for the each processor and whose distances in dimensional order from the origin of the relative coordinate system provided for the each processor are identical,
selecting, from among the plurality of processors, based on the relative coordinate system provided for the each processor, a different group of plural destination processors having the determined distinct set of plural destination relative coordinates, and
simultaneously transmitting data from the each processor to the selected different group of plural destination processors through the communication channels determined in dimensional order, wherein
when performing all-to-all communication in the parallel computing system, each of the plurality of processors repeats the simultaneous data-transmission by changing the distinct set of plural destination relative coordinates so that each of all the plurality of processors is selected once as a destination processor included in one of the different groups of plural destination processors; and
for any pair of first and second processors among the plurality of processors, first different groups of plural destination processors selected by the first processor have first distinct sets of plural destination relative coordinates that are respectively identical to second distinct sets of plural destination relative coordinates for second different groups of plural destination processors selected by the second processor, and identical transmission control including the simultaneous data-transmission is performed on both the first and second processors in the parallel computing system, based on the first and second distinct sets of plural destination relative coordinates, so that a number of inter processor communications routed through respective links is equalized among all links in the parallel computing system.

2. The parallel computing system according to claim 1, wherein
each of the plurality of processors in the parallel computing system is configured to simultaneously transmit data to a maximum of four processors, wherein,
when L represents the maximum value of the lengths in respective dimensions of the interconnection network and Xn and Yn respectively represent the relative coordinate value in a first dimension and the relative coordinate value in a second dimension of the relative coordinates of an n-th destination processor with respect to a source processor, each of the plurality of processors performs:
first transmission processing of transmitting data to four destination processors located at respective positions of relative coordinates (X1, Y1) in which the absolute value of X1 is set to be different from the absolute value of Y1, and in which the absolute value of X1 and the absolute value of Y1 are set to be different from half the L value, relative coordinates (X2, Y2) in which X2 is set to the sign-inverted value of X1 and Y2 is set to the sign-inverted value of Y1, relative coordinates (X3, Y3) in which X3 is set to Y1 and Y3 is set to X1, and relative coordinates (X4, Y4) in which X4 is set to the sign-inverted value of Y1 and Y4 is set to the sign-inverted value of X1;
second transmission processing of transmitting data to four destination processors located at the respective positions of relative coordinates (X1, Y1) in which the absolute value of X1 is set to be equal to the absolute value of Y1, relative coordinates (X2, Y2) in which X2 is set to the sign-inverted value of X1 and Y2 is set to the sign-inverted value of Y1, relative coordinates (X3, Y3) in which X3 is set to the sign-inverted value of X1 and Y3 is set to Y1, and relative coordinates (X4, Y4) in which X4 is set to X1 and Y4 is set to the sign-inverted value of Y1; and
third transmission processing of transmitting data to four destination processors located at the respective positions of relative coordinates (X1, 0), relative coordinates (0, Y1) in which the absolute value of Y1 is set to be equal to the absolute value of X1, relative coordinates (X2, 0) in which X2 is set to the sign-inverted value of X1, and relative coordinates (0, Y2) in which Y2 is set to the sign-inverted value of Y1, and
wherein the plurality of processors in the parallel computing system perform, at the same timing, data communications using a same transmission processing with destination processors having the same relative coordinates.

3. The parallel computing system according to claim 1, wherein
each of the plurality of processors in the parallel computing system is configured to simultaneously transmit data to a maximum of four processors, wherein,
when the interconnection network is a two-dimensional torus and is different in length between a first dimension and a second dimension thereof, and when L represents the maximum value of the length in the first dimension and the length in the second dimension of the interconnection network and Xn and Yn respectively represent the relative coordinate value in the first dimension and the relative coordinate value in the second dimension of the relative coordinates of an n-th destination processor with respect to a source processor, each of the plurality of processors perform:
first transmission processing of transmitting data to four destination processors located at respective positions of relative coordinates (X1, Y1) in which the absolute value of X1 is set to be different from the absolute value of Y1, and in which the absolute value of X1 and the absolute value of Y1 are set to be different from half the L value, relative coordinates (X2, Y2) in which X2 is set to the sign-inverted value of X1 and Y2 is set to the sign-inverted value of Y1, relative coordinates (X3, Y3) in which X3 is set to Y1 and Y3 is set to X1, and relative coordinates (X4, Y4) in which X4 is set to the sign-inverted value of Y1 and Y4 is set to the sign-inverted value of X1,
second transmission processing of transmitting data to four destination processors located at the respective positions of relative coordinates (X1, Y1) in which the absolute value of X1 is set to be equal to the absolute value of Y1, relative coordinates (X2, Y2) in which X2 is set to the sign-inverted value of X1 and Y2 is set to the sign-inverted value of Y1, relative coordinates (X3, Y3) in which X3 is set to the sign-inverted value of X1 and Y3 is set to Y1, and relative coordinates (X4, Y4) in which X4 is set to X1 and Y4 is set to the sign-inverted value of Y1, and
third transmission processing of transmitting data to four destination processors located at the respective positions of relative coordinates (X1, 0), relative coordinates (0, Y1) in which the absolute value of Y1 is set to be equal to the absolute value of X1, relative coordinates (X2, 0) in which X2 is set to the sign-inverted value of X1, and relative coordinates (0, Y2) in which Y2 is set to the sign-inverted value of Y1, and wherein
the plurality of processors in the parallel computing system perform, at the same timing, data communications using a same transmission processing with destination processors having the same relative coordinates.

4. The parallel computing system according to claim 1, wherein
each of the plurality of processors in the parallel computing system is configured to simultaneously transmit data to a maximum of four processors, wherein,
when the interconnection network is a two-dimensional mesh, and when L represents the maximum value of the length in a first dimension and the length in a second dimension of the interconnection network and Xn and Yn respectively represent the relative coordinate value in the first dimension and the relative coordinate value in the second dimension of the relative coordinates of an n-th destination processor with respect to a source processor, each of the plurality of processors performs:
first transmission processing of transmitting data to four destination processors located at respective positions of relative coordinates (X1, Y1) in which the absolute value of X1 is set to be different from the absolute value of Y1, and in which the absolute value of X1 and the absolute value of Y1 are set to be different from half the L value, relative coordinates (X2, Y2) in which X2 is set to the sign-inverted value of X1 and Y2 is set to the sign-inverted value of Y1, relative coordinates (X3, Y3) in which X3 is set to Y1 and Y3 is set to X1, and relative coordinates (X4, Y4) in which X4 is set to the sign-inverted value of Y1 and Y4 is set to the sign-inverted value of X1,
second transmission processing of transmitting data to four destination processors located at the respective positions of relative coordinates (X1, Y1) in which the absolute value of X1 is set to be equal to the absolute value of Y1, relative coordinates (X2, Y2) in which X2 is set to the sign-inverted value of X1 and Y2 is set to the sign-inverted value of Y1, relative coordinates (X3, Y3) in which X3 is set to the sign-inverted value of X1 and Y3 is set to Y1, and relative coordinates (X4, Y4) in which X4 is set to X1 and Y4 is set to the sign-inverted value of Y1, and
third transmission processing of transmitting data to four destination processors located at the respective positions of relative coordinates (X1, 0), relative coordinates (0, Y1) in which the absolute value of Y1 is set to be equal to the absolute value of X1, relative coordinates (X2, 0) in which X2 is set to the sign-inverted value of X1, and relative coordinates (0, Y2) in which Y2 is set to the sign-inverted value of Y1, and
wherein the plurality of processors in the parallel computing system performs, at the same timing, data communications using a same transmission processing with destination processors having the same relative coordinates.

5. The parallel computing system according to claim 2, wherein,
when the L value is an odd number, each of the plurality of processors repeats the simultaneous data-transmission to four destination processors $(L-1)^2/4$ times with the absolute value of X1 and the absolute value of Y1 set to be different from each other and performing repeats the simultaneous transmission to four destination processors $(L-1)/2$ times with the absolute value of X1 and the absolute value of Y1 set to be equal to each other, while changing the relative coordinate values in each of the simultaneous data-transmissions, and
wherein, when the L value is an even number, each of the plurality of processors repeats simultaneous transmission to four destination processors the $(L-1)\,2/4$ times with the absolute value of X1 and the absolute value of Y1 set to be different from each other, repeats the simultaneous data-transmission to four destination processors $(L/2-1)$ times with the absolute value of X1 and the absolute value of Y1 set to be equal to each other, and performs once the simultaneous data-transmission to three destination processors with the absolute value of X1 and the absolute value of Y1 set to be equal to each other and set to half the L value, while changing the relative coordinate values in each of the simultaneous data-transmissions.

6. The parallel computing system according to claim 1, wherein,
when the interconnection network is a three-dimensional torus and is equal in length among a first dimension, a second dimension, and a third dimension thereof, and when L represents the length in each of the dimensions of the interconnection network and Xn, Yn, and Zn respectively represent the relative coordinate value in the first dimension, the relative coordinate value in the second dimension, and the relative coordinate value in the third dimension of the relative coordinates of an n-th destination processor with respect to a source processor, each of the plurality of processors performs:
first transmission processing of transmitting data to six destination processors located at respective positions of:
relative coordinates (X1, Y1, Z1) in which at least one of the absolute value of X1, the absolute value of Y1, and the absolute value of Z1 is different from the other absolute values, and in which the relative coordinates correspond to one of conditions of:
1) each of the absolute values X1, Y1, and Z1 is set to be different from zero and half the L value, 2) X1 is set to zero and each of the absolute values X1 and Z1 is set to be different from zero and half the L value, and
3) X1 and Y1 are set to zero and the absolute value of Z1 is set to be different from zero and half the L value,
relative coordinates (X2, Y2, Z2) in which X2 is set to the sign-inverted value of X1, Y2 is set to the sign-inverted value of Y1, and Z2 is set to the sign-inverted value of Z1,
relative coordinates (X3, Y3, Z3) in which X3 is set to Z1, Y3 is set to X1, and Z3 is set to Y1,
relative coordinates (X4, Y4, Z4) in which X4 is set to the sign-inverted value of Z1, Y4 is set to the sign-inverted value of X1, and Z4 is set to the sign-inverted value of Y1,
relative coordinates (X5, Y5, Z5) in which X5 is set to Y1, Y5 is set to Z1, and Z5 is set to X1, and
relative coordinates (X6, Y6, Z6) in which X6 is set to the sign-inverted value of Y1, Y6 is set to the sign-inverted value of Z1, and Z6 is set to the sign-inverted value of X1; and
second transmission processing of transmitting data to four destination processors located at the respective positions of relative coordinates (X1, Y1, Z1) in which the absolute values of X1, Y1, and Z1 are set to the same value different from zero and half the L value, relative coordinates (X2, Y2, Z2) in which X2 is set to the sign-inverted value of X1, Y2 is set to the sign-inverted value of Y1, and Z2 is set to the sign-inverted value of Z1, relative coordinates (X3, Y3, Z3) in which X3 is set to X1, Y3 is set to Y1, and Z3 is set to the sign-inverted value of Z1, and relative coordinates (X4, Y4, Z4) in which X4 is set to the sign-inverted value of X1, Y4 is set to the sign-inverted value of Y1, and Z4 is set to Z1, wherein
the plurality of processors in the parallel computing system performs, at the same timing, data communications using a same transmission processing with destination processors having the same relative coordinates.

7. The parallel computing system according to claim 1, wherein,
when the interconnection network is a three-dimensional torus with one of a length in a first dimension, a length in a second dimension, and a length in a third dimension of the interconnection network different from the other lengths, and when L represents a maximum value of the length in the first dimension, the length in the second dimension, and the length in the third dimension of the interconnection network and Xn, Yn, and Zn respectively represent the relative coordinate value in the first dimension, the relative coordinate value in the second dimension, and the relative coordinate value in the third dimension of the relative coordinates of an n-th destination processor with respect to a source processor, each of the plurality of processors performs:
first transmission processing of transmitting data to six destination processors located at respective positions of:
relative coordinates (X1, Y1, Z1) in which at least one of the absolute value of X1, the absolute value of Y1, and the absolute value of Z1 is different from the other absolute values, and in which the relative coordinates correspond to one of conditions of:

1) each of the absolute values X1, Y1, and Z1 is set to be different from zero and half the L value,
2) X1 is set to zero and each of the absolute values X1 and Z1 is set to be different from zero and half the L value,
3) X1 and Y1 are set to zero and the absolute value of Z1 is set to be different from zero and half the L value,
relative coordinates (X2, Y2, Z2) in which X2 is set to the sign-inverted value of X1, Y2 is set to the sign-inverted value of Y1, and Z2 is set to the sign-inverted value of Z1,
relative coordinates (X3, Y3, Z3) in which X3 is set to Z1, Y3 is set to X1, and Z3 is set to Y1,
relative coordinates (X4, Y4, Z4) in which X4 is set to the sign-inverted value of Z1, Y4 is set to the sign-inverted value of X1, and Z4 is set to the sign-inverted value of Y1,
relative coordinates (X5, Y5, Z5) in which X5 is set to Y1, Y5 is set to Z1, and Z5 is set to X1, and
relative coordinates (X6, Y6, Z6) in which X6 is set to the sign-inverted value of Y1, Y6 is set to the sign-inverted value of Z1, and Z6 is set to the sign-inverted value of X1; and
second transmission processing of transmitting data to four destination processors located at the respective positions of:
relative coordinates (X1, Y1, Z1) in which the absolute values of X1, Y1, and Z1 are set to the same value different from zero and half the L value,
relative coordinates (X2, Y2, Z2) in which X2 is set to the sign-inverted value of X1, Y2 is set to the sign-inverted value of Y1, and Z2 is set to the sign-inverted value of Z1,
relative coordinates (X3, Y3, Z3) in which X3 is set to X1, Y3 is set to Y1, and Z3 is set to the sign-inverted value of Z1, and
relative coordinates (X4, Y4, Z4) in which X4 is set to the sign-inverted value of X1, Y4 is set to the sign-inverted value of Y1, and Z4 is set to Z1, wherein
the plurality of processors in the parallel computing system performs, at the same timing, data communications using a same transmission processing with destination processors having the same relative coordinates.

8. The parallel computing system according to claim 1, wherein,
when the interconnection network is a three-dimensional mesh, and when L represents a maximum value of a length in a first dimension, a length in a second dimension, and a length in a third dimension of the interconnection network and Xn, Yn, and Zn respectively represent the relative coordinate value in the first dimension, the relative coordinate value in the second dimension, and the relative coordinate value in the third dimension of the relative coordinates of an n-th destination processor with respect to a source processor, each of the plurality of processors performs:
first transmission processing of transmitting data to six destination processors located at respective positions of:
relative coordinates (X1, Y1, Z1) in which at least one of the absolute value of X1, the absolute value of Y1, and the absolute value of Z1 is different from the other absolute values, and in which the relative coordinates correspond to one of the following conditions of:

1) X1 is set to zero and one each of the absolute values X1, Y1, and Z1 is set to be different from zero and half the L value,
2) X1 is set to zero and each of the absolute values X1 and Z1 is set to be different from zero and half the L value,
3) X1 and Y1 are set to zero and the absolute value of Z1 is set to be different from zero and half the L value, relative coordinates (X2, Y2, Z2) in which X2 is set to the sign-inverted value of X1, Y2 is set to the sign-inverted value of Y1, and Z2 is set to the sign-inverted value of Z1, relative coordinates (X3, Y3, Z3) in which X3 is set to Z1, Y3 is set to X1, and Z3 is set to Y1, relative coordinates (X4, Y4, Z4) in which X4 is set to the sign-inverted value of Z1, Y4 is set to the sign-inverted value of X1, and Z4 is set to the sign-inverted value of Y1, relative coordinates (X5, Y5, Z5) in which X5 is set to Y1, Y5 is set to Z1, and Z5 is set to X1, and relative coordinates (X6, Y6, Z6) in which X6 is set to the sign-inverted value of Y1, Y6 is set to the sign-inverted value of Z1, and Z6 is set to the sign-inverted value of X1; and second transmission processing of transmitting data to four destination processors located at the respective positions of relative coordinates (X1, Y1, Z1) in which the absolute values of X1, Y1, and Z1 are set to the same value different from zero and half the L value, relative coordinates (X2, Y2, Z2) in which X2 is set to the sign-inverted value of X1, Y2 is set to the sign-inverted value of Y1, and Z2 is set to the sign-inverted value of Z1, relative coordinates (X3, Y3, Z3) in which X3 is set to X1, Y3 is set to Y1, and Z3 is set to the sign-inverted value of Z1, and relative coordinates (X4, Y4, Z4) in which X4 is set to the sign-inverted value of X1, Y4 is set to the sign-inverted value of Y1, and Z4 is set to Z1, wherein the plurality of processors in the parallel computing system performs, at the same timing, data communications using a same transmission processing with destination processors having the same relative coordinates.

9. The parallel computing system according to claim 6, wherein, when the L value is an odd number, each of the plurality of processors repeats the simultaneous data-transmission to six destination processors $(L^3-4L+3)/4$ times, and repeats the simultaneous data-transmission to four destination processors L−1 times, while changing the relative coordinate values in each of the simultaneous data-transmissions, and wherein, when the L value is an even number, each of the plurality of processors repeats the simultaneous data-transmission to six destination processors $(L^3-4L+1)/4$ times, repeats the simultaneous data-transmission to four destination processors L−2 times, and performs once the simultaneous data-transmission to seven destination processors, while changing the relative coordinate values in each of the simultaneous data-transmissions.

10. A method performed by each of a plurality of processors in a parallel computing system, the plurality of processors being multi-dimensionally coupled to each other in an interconnection network having multi-dimensional torus or mesh topology, each of the plurality of processors having a relative coordinate system common to all of the plurality of processors so that any one of the plurality of processors in the parallel computing system is uniquely identified by a set of relative coordinates based on the relative coordinate system, the method comprising:

determining, in dimensional order, communication channels to other processors in the interconnection network, determining a plurality of distinct combinations each including plural sets of distinct destination relative coordinates so that the plurality of distinct combinations cover all the plurality of processors except the each processor in the parallel computing system, performing a transmission process to transmit data to all the plurality of processors in the parallel computing system, the transmission process including transmitting data, through the communication channels determined in dimensional order, simultaneously from the each processor to the plural sets of distinct destination relative coordinates included in each of the determined plurality of distinct combinations, wherein the plural sets of distinct destination relative coordinates included in each of the plurality of distinct combinations are determined to be symmetric about the origin of the relative coordinate system and to have identical distances in dimensional order from the origin of the relative coordinate system, so that a number of inter processor communications routed through respective links is equalized among all links in the parallel computing system.

11. The method of claim 10, wherein in a case where the interconnection network has a two-dimensional torus or mesh topology with two sides having a same length of 2n+1 where n is a natural number, and the relative coordinate system is set such that a set of relative coordinates of any one of the plurality of processors in the parallel computing system is represented as a set of relative coordinates (x, y) where x is an integer whose sign indicates a direction along an x-axis on a dimensional-order path from the origin (0, 0) and whose absolute value indicates a number of links of processors along the x-axis on the dimensional-order path, and y is an integer whose sign indicates a direction along a y-axis on the dimensional-order path from the origin (0, 0) and whose absolute value indicates a number of links of processors along the y-axis on the dimensional-order path from the origin (0, 0), the transmission process includes:

a first transmission that transmits, for each of all pairs of natural numbers i and j satisfying that 0<j<i=<n, data simultaneously to a distinct combination of four sets of destination relative coordinates: (i, j), (−i, −j), (j, i), and (−j, −i), a second transmission that transmits, for each of all pairs of natural numbers i and j satisfying that 0<j<i=<n, data simultaneously to a distinct combination of four sets of destination relative coordinates: (i, −j), (−i, j), (−j, i), and (j, −i);

a third transmission that transmits, for each of all natural numbers i satisfying that 0<i=<n, data simultaneously to a distinct combination of four sets of destination relative coordinates: (i, 0), (−i, 0), (0, i), and (0, −i); and a fourth transmission that transmits, for each of all natural numbers i satisfying that 0<i=<n, data simultaneously to a distinct combination of four sets of destination relative coordinates: (i, i), (−i, −i), (−i, i), and (i, −i).

12. The method of claim 10, wherein
in a case where the interconnection network has a two-dimensional torus or mesh topology with two sides having a same length of 2n+2 where n is a natural number, and the relative coordinate system is set such that a set of relative coordinates of any one of the plurality of processors in the parallel computing system is represented as a set of relative coordinates (x, y) where x is an integer whose sign indicates a direction along an x-axis on a dimensional-order path from the origin (0, 0) and whose absolute value indicates a number of links of processors along the x-axis on the dimensional-order path, and y is an integer whose sign indicates a direction along a y-axis on the dimensional-order path from the origin (0, 0) and whose absolute value indicates a number of links of processors along the y-axis on the dimensional-order path from the origin (0, 0), the transmission process includes:
a first transmission that transmits, for each of all pairs of natural numbers i and j satisfying that 0<j<i=<n, data simultaneously to a distinct combination of four sets of destination relative coordinates: (i, j), (−i, −j), (j, i), and (−j, −i);
a second transmission that transmits, for each of all pairs of natural numbers i and j satisfying that 0<j<i=<n, data simultaneously to a distinct combination of four sets of destination relative coordinates: (i, −j), (−i, j), (−j, i), and (j, −i);
a third transmission that transmits, for each of all natural numbers i satisfying that 0<i=<n, data simultaneously to a distinct combination of four sets of destination relative coordinates: (i, 0), (−i, 0), (0, i), and (0, −i);
a fourth transmission that transmits, for each of all natural numbers i satisfying that 0<i=<n, data simultaneously to a distinct combination of four sets of destination relative coordinates: (i, i), (−i, −i), (−i, i), and (i, −i);
a fifth simultaneous transmission that transmits, for each of all natural numbers i satisfying that 0<i=<n, data simultaneously to a distinct combination of four sets of destination relative coordinates: (n+1, i), (−n−1, −i), (i, n+1), and (−i, −n−1); and
a sixth transmission that transmits data simultaneously to a distinct combination of three sets of destination relative coordinates: (n+1, 0), (0, n+1), and (−n−1, −n−1).

13. The method of claim 10, wherein in a case where the interconnection network has a three-dimensional torus or mesh topology with three sides having a same length of 2n+1 where n is a natural number, and the relative coordinate system is set such that a set of relative coordinates of any one of the plurality of processors in the parallel computing system is represented as a set of relative coordinates (x, y, z) where x is an integer whose sign indicates a direction along an x-axis on a dimensional-order path from the origin (0, 0, 0) and whose absolute value indicates a number of links of processors along the x-axis on the dimensional-order path, y is an integer whose sign indicates a direction along a y-axis on the dimensional-order path from the origin (0, 0, 0) and whose absolute value indicates a number of links of processors along the y-axis on the dimensional-order path from the origin (0, 0, 0), and z is an integer whose sign indicates a direction along an z-axis on the dimensional-order path from the origin (0, 0, 0) and whose absolute value indicates a number of links of processors along the z-axis on the dimensional-order path, the transmission process includes:
a first transmission that performs, for each of all combinations of three natural numbers i, j, and k satisfying that 0<k<j<i=<n,
transmitting data simultaneously to a distinct combination of six sets of destination relative coordinates: (i, j, k), (−i, −j, −k), (k, i, j), (−k, −i, −j), (j, k, i), and (−j, −k, −i),
transmitting data simultaneously to a distinct combination of six sets of destination relative coordinates: (i, j, −k), (−i, −j, k), (−k, i, j), (k, −i, −j), (j, −k, i), and (−j, k, −i),
transmitting data simultaneously to a distinct combination of six sets of destination relative coordinates: (i, −j, k), (−i, j, −k), (k, i, −j), (−k, −i, j), (−j, k, i), and (j, −k, −i),
transmitting data simultaneously to a distinct combination of six sets of destination relative coordinates: (i, −j, −k), (−i, j, k), (−k, i, −j), (k, −i, j), (−j, −k, i), and (j, k, −i),
transmitting data simultaneously to a distinct combination of six sets of destination relative coordinates: (i, k, j), (−i, −k, −j), (j, i, k), (−j, −i, −k), (k, j, i), and (−k, −j, −i),
transmitting data simultaneously to a distinct combination of six sets of destination relative coordinates: (i, k, −j), (−i, −k, j), (−j, i, k), (j, −i, −k), (k, −j, i), and (−k, j, −i),
transmitting data simultaneously to a distinct combination of six sets of destination relative coordinates: (i, −k, j), (−i, k, −j), (j, i, −k), (−j, −i, k), (−k, j, i), and (k, −j, −i), and
transmitting data simultaneously to a distinct combination of six sets of destination relative coordinates: (i, −k, −j), (−i, k, j), (−j, i, −k), (j, −i, k), (−k, −j, i), and (k, j, −i);
a second transmission that performs, for each of all combinations of three natural numbers i, and j satisfying that 0<j<i=<n,
transmitting data simultaneously to a distinct combination of six sets of destination relative coordinates: (i, i, j), (−i, −i, −j), (j, i, i), (−j, −i, −i), (i, j, i), and (−i, −j, −i),
transmitting data simultaneously to a distinct combination of six sets of destination relative coordinates: (i, i, −j), (−i, −i, j), (−j, i, i), (j, −i, −i), (i, −j, i), and (−i, j, −i),
transmitting data simultaneously to a distinct combination of six sets of destination relative coordinates: (i, −i, j), (−i, i, −j), (j, i, −i), (−j, −i, i), (−i, j, i), and (i, −j, −i),
transmitting data simultaneously to a distinct combination of six sets of destination relative coordinates: (i, −i, −j), (−i, i, j), (−j, i, −i), (j, −i, i), (−i, −j, i), and (i, j, −i),
transmitting data simultaneously to a distinct combination of six sets of destination relative coordinates: (j, j, i), (−j, −j, −i), (i, j, j), (−i, −j, −j), (j, i, j), and (−j, −i, −j),
transmitting data simultaneously to a distinct combination of six sets of destination relative coordinates: (j, j, −i), (−j, −j, i), (−i, j, j), (i, −j, −j), (j, −i, j), and (−j, i, −j), transmitting data simultaneously to a distinct combination of six sets of destination relative coordinates: (j, −j, i), (−j, j, −i), (i, j, −j), (−i, −j, j), (−j, i, j), and (j, −i, −j), transmitting data simultaneously to a distinct combination of six sets of destination relative coordinates: (j, −j, −i), (−j, j, i), (−i, j, −j), (i, −j, j), (−j, −i, j), and (j, i, −j);

transmitting data simultaneously to a distinct combination of six sets of destination relative coordinates: (0, i, j), (0, −i, −j), (j, 0, i), (−j, 0, −i), (i, j, 0), and (−i, −j, 0);

transmitting data simultaneously to a distinct combination of six sets of destination relative coordinates: (0, i, −j), (0, −i, j), (−j, 0, i), (j, 0, −i), (i, −j, 0), and (−i, j, 0), transmitting data simultaneously to a distinct combination of six sets of destination relative coordinates: (0, j, i), (0, −j, −i), (i, 0, j), (−i, 0, −j), (j, i, 0), and (−j, −i, 0), and transmitting data simultaneously to a distinct combination of six sets of destination relative coordinates: (0, j, −i), (0, −j, i), (−i, 0, j), (i, 0, −j), (j, −i, 0), and (−j, i, 0); and a third transmission that performs, for each of all natural numbers i satisfying that $0 < i \leq n$, transmitting data simultaneously to a distinct combination of six sets of destination relative coordinates: (0, i, i), (0, −i, −i), (i, 0, i), (−i, 0, −i), (i, i, 0), and (−i, −i, 0), transmitting data simultaneously to a distinct combination of six sets of destination relative coordinates: (i, 0, 0), (−i, 0, 0), (0, 0, i), (0, 0, −i), (0, i, 0), and (0, −i, 0), transmitting data simultaneously to a distinct combination of four sets of destination relative coordinates: (i, i, i), (−i, −i, −i), (i, i, −i), and (−i, −i, i), and transmitting data simultaneously to a distinct combination of four sets of destination relative coordinates: (i, −i, i), (−i, i, −i), (i, −i, −i), and (−i, i, i).

14. The method of claim 10, wherein in a case where the interconnection network has a three-dimensional torus or mesh topology with three sides having a same length of 2n+2 where n is a natural number, and the relative coordinate system is set such that a set of relative coordinates of any one of the plurality of processors in the parallel computing system is represented as a set of relative coordinates (x, y, z) where x is an integer whose sign indicates a direction along an x-axis on a dimensional-order path from the origin (0, 0, 0) and whose absolute value indicates a number of links of processors along the x-axis on the dimensional-order path, y is an integer whose sign indicates a direction along a y-axis on the dimensional-order path from the origin (0, 0, 0) and whose absolute value indicates a number of links of processors along the y-axis on the dimensional-order path from the origin (0, 0, 0), and z is an integer whose sign indicates a direction along an z-axis on the dimensional-order path from the origin (0, 0, 0) and whose absolute value indicates a number of links of processors along the z-axis on the dimensional-order path, the transmission process includes:

a first transmission that performs, for each of all combinations of three natural numbers i, j, and k satisfying that $0 < k < j < i \leq n$, transmitting data simultaneously to a distinct combination of six sets of destination relative coordinates: (i, j, k), (−i, −j, −k), (k, i, j), (−k, −i, −j), (j, k, i), and (−j, −k, −i), transmitting data simultaneously to a distinct combination of six sets of destination relative coordinates: (i, j, −k), (−i, −j, k), (−k, i, j), (k, −i, −j), (j, −k, i), and (−j, k, −i), transmitting data simultaneously to a distinct combination of six sets of destination relative coordinates: (i, −j, k), (−i, j, −k), (k, i, −j), (−k, −i, j), (−j, k, i), and (j, −k, −i), transmitting data simultaneously to a distinct combination of six sets of destination relative coordinates: (i, −j, −k), (−i, j, k), (−k, i, −j), (k, −i, j), (−j, −k, i), and (j, k, −i), transmitting data simultaneously to a distinct combination of six sets of destination relative coordinates: (i, k, j), (−i, −k, −j), (j, i, k), (−j, −i, −k), (k, j, i), and (−k, −j, −i), transmitting data simultaneously to a distinct combination of six sets of destination relative coordinates: (i, k, −j), (−i, −k, j), (−j, i, k), (j, −i, −k), (k, −j, i), and (−k, j, −i), transmitting data simultaneously to a distinct combination of six sets of destination relative coordinates: (i, −k, j), (−i, k, −j), (j, i, −k), (−j, −i, k), (−k, j, i), and (k, −j, −i), and transmitting data simultaneously to a distinct combination of six sets of destination relative coordinates: (i, −k, −j), (−i, k, j), (−j, i, −k), (j, −i, k), (−k, −j, i), and (k, j, −i);

a second transmission that performs, for each of all combinations of three natural numbers i, and j satisfying that $0 < j < i \leq n$, transmitting data simultaneously to a distinct combination of six sets of destination relative coordinates: (i, i, j), (−i, −i, −j), (j, i, i), (−j, −i, −i), (i, j, i), and (−i, −j, −i), transmitting data simultaneously to a distinct combination of six sets of destination relative coordinates: (i, i, −j), (−i, −i, j), (−j, i, i), (j, −i, −i), (i, −j, i), and (−i, j, −i), transmitting data simultaneously to a distinct combination of six sets of destination relative coordinates: (i, −i, j), (−i, i, −j), (j, i, −i), (−j, −i, i), (−i, j, i), and (i, −j, −i), transmitting data simultaneously to a distinct combination of six sets of destination relative coordinates: (i, −i, −j), (−i, i, j), (−j, i, −i), (j, −i, i), (−i, −j, i), and (i, j, −i), transmitting data simultaneously to a distinct combination of six sets of destination relative coordinates: (j, j, i), (−j, −j, −i), (i, j, j), (−i, −j, −j), (j, i, j), and (−j, −i, −j), transmitting data simultaneously to a distinct combination of six sets of destination relative coordinates: (j, j, −i), (−j, −j, i), (−i, j, j), (i, −j, −j), (j, −i, j), and (−j, i, −j), transmitting data simultaneously to a distinct combination of six sets of destination relative coordinates: (j, −j, i), (−j, j, −i), (i, j, −j), (−i, −j, j), (−j, i, j), and (j, −i, −j), transmitting data simultaneously to a distinct combination of six sets of destination relative coordinates: (j, −j, −i), (−j, j, i), (−i, j, −j), (i, −j, j), (−j, −i, j), and (j, i, −j);

transmitting data simultaneously to a distinct combination of six sets of destination relative coordinates: (0, i, j), (0, −i, −j), (j, 0, i), (−j, 0, −i), (i, j, 0), and (−i, −j, 0);

transmitting data simultaneously to a distinct combination of six sets of destination relative coordinates: (0, i, −j), (0, −i, j), (−j, 0, i), (j, 0, −i), (i, −j, 0), and (−i, j, 0), transmitting data simultaneously to a distinct combination of six sets of destination relative coordinates: (0, j, i), (0, −j, −i), (i, 0, j), (−i, 0, −j), (j, i, 0), and (−j, −i, 0), and transmitting data simultaneously to a distinct combination of six sets of destination relative coordinates: (0, j, −i), (0, −j, i), (−i, 0, j), (i, 0, −j), (j, −i, 0), and (−j, i, 0);

a third transmission that performs, for each of all natural numbers i satisfying that 0<i=<n, transmitting data simultaneously to a distinct combination of six sets of destination relative coordinates: (0, i, i), (0, −i, −i), (i, 0, i), (−i, 0, −i), (i, i, 0), and (−i, −i, 0), transmitting data simultaneously to a distinct combination of six sets of destination relative coordinates: (i, 0, 0), (−i, 0, 0), (0, 0, i), (0, 0, −i), (0, i, 0), and (0, −i, 0), transmitting data simultaneously to a distinct combination of four sets of destination relative coordinates: (i, i, i), (−i, −i, −i), (i, i, −i), and (−i, −i, i), and transmitting data simultaneously to a distinct combination of four sets of destination relative coordinates: (i, −i, i), (−i, i, −i), (i, −i, −i), and (−i, i, i);

a fourth transmission that performs, for each of all combinations of two natural numbers i and j satisfying that 0<j<i=<n, transmitting data simultaneously to a distinct combination of six sets of destination relative coordinates: (n+1, i, j), (−n−1, −i, −j), (j, n+1, i), (−j, −n−1, −i), (i, j, n+1), and (−i, −j, −n−1), transmitting data simultaneously to a distinct combination of six sets of destination relative coordinates: (n+1, i, −j), (−n−1, −i, j), (−j, n+1, i), (j, −n−1, −i), (i, −j, n+1), and (−i, j, −n−1), transmitting data simultaneously to a distinct combination of six sets of destination relative coordinates: (n+1, j, i), (−n−1, −j, −i), (i, n+1, j), (−i, −n−1, −j), (j, i, n+1), and (−j, −i, −n−1), and transmitting data simultaneously to a distinct combination of six sets of destination relative coordinates: (n+1, −j, i), (−n−1, j, i), (i, n+1, −j), (−i, −n−1, j), (−j, i, n+1), and (j, −i, −n−1);

a fifth transmission that performs, for each of all natural numbers i satisfying that 0<i=<n, transmitting data simultaneously to a distinct combination of six sets of destination relative coordinates: (n+1, i, i), (−n−1, −i, −i), (i, n+1, i), (−i, −n−1, −i), (i, i, n+1), and (−i, −i, −n−1), transmitting data simultaneously to a distinct combination of six sets of destination relative coordinates: (n+1, i, 0), (−n−1, −i, 0), (0, n+1, i), (0, −n−1, −i), (i, 0, n+1), and (−i, 0, −n−1), transmitting data simultaneously to a distinct combination of six sets of destination relative coordinates: (n+1, 0, i), (−n−1, 0, i), (i, n+1, 0), (−i, −n−1, 0), (0, i, n+1), and (0, −i, −n−1), and transmitting data simultaneously to a distinct combination of six sets of destination relative coordinates: (i, n+1, n+1), (−i, −n−1, −n−1), (n+1, i, n+1), (−n−1, −i, −n−1), (n+1, n+1, i), and (−n−1, −n−1, −i); and a sixth transmission that performs:

transmitting data simultaneously to a distinct combination of four sets of destination relative coordinates: (n+1, n+1, 0), (0, 0, n+1), (−n−1, 0, −n−1), and (0, −n−1, 0), and transmitting data simultaneously to a distinct combination of three sets of destination relative coordinates: (0, n+1, n+1), (n+1, 0, 0), and (−n−1, −n−1, −n−1).

* * * * *